(12) United States Patent
Kang et al.

(10) Patent No.: US 12,192,445 B2
(45) Date of Patent: Jan. 7, 2025

(54) INTER PREDICTION METHOD BASED ON VARIABLE COEFFICIENT DEEP LEARNING

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Na Young Kim, Seoul (KR); Jung Kyung Lee, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 18 days.

(21) Appl. No.: 18/126,623

(22) Filed: Mar. 27, 2023

(65) Prior Publication Data
US 2023/0239462 A1 Jul. 27, 2023

Related U.S. Application Data

(63) Continuation of application No. PCT/KR2021/013218, filed on Sep. 28, 2021.

(30) Foreign Application Priority Data

Sep. 28, 2020 (KR) .......................... 10-2020-0126111
Sep. 28, 2021 (KR) .......................... 10-2021-0127795

(51) Int. Cl.
*H04N 19/105* (2014.01)
*H04N 19/109* (2014.01)
(Continued)

(52) U.S. Cl.
CPC ......... *H04N 19/105* (2014.11); *H04N 19/109* (2014.11); *H04N 19/139* (2014.11);
(Continued)

(58) Field of Classification Search
CPC ... G06N 3/04; G06N 3/08; G06T 9/00; H04N 19/105; H04N 19/109; H04N 19/132;
(Continued)

(56) References Cited

U.S. PATENT DOCUMENTS 10,841,577 B2 11/2020 Cho et al.
11,019,355 B2 5/2021 Cho et al.
(Continued)

FOREIGN PATENT DOCUMENTS

EP 3651462 A1 5/2020
KR 20180119753 A 11/2018
(Continued)

*Primary Examiner* — Kathleen M Walsh
(74) *Attorney, Agent, or Firm* — Lempia Summerfield Katz LLC

(57) ABSTRACT

An inter prediction method allows a variable coefficient deep learning model to adaptively learn characteristics of a video; transmits a variable coefficient deep learning model parameter generated from the learning from an image encoding device to an image decoding device; and refers to a virtual reference frame generated by the variable coefficient deep learning model.

16 Claims, 18 Drawing Sheets

(51) Int. Cl.
*H04N 19/139* (2014.01)
*H04N 19/159* (2014.01)
*H04N 19/176* (2014.01)
*H04N 19/513* (2014.01)

(52) U.S. Cl.
CPC ......... *H04N 19/159* (2014.11); *H04N 19/176* (2014.11); *H04N 19/513* (2014.11)

(58) Field of Classification Search
CPC .. H04N 19/139; H04N 19/159; H04N 19/176; H04N 19/513; H04N 19/52; H04N 19/54; H04N 19/577
USPC .................................................. 375/240.16
See application file for complete search history.

(56) References Cited

U.S. PATENT DOCUMENTS

| | | | |
|---|---|---|---|
| 11,265,564 B2 | 3/2022 | Lee et al. | |
| 2019/0246102 A1 | 8/2019 | Cho et al. | |
| 2019/0306526 A1 | 10/2019 | Cho et al. | |
| 2020/0154123 A1 | 5/2020 | Lee et al. | |
| 2022/0094962 A1* | 3/2022 | Choi | H04N 19/136 |
| 2022/0166996 A1 | 5/2022 | Lee et al. | |

FOREIGN PATENT DOCUMENTS

| | | |
|---|---|---|
| KR | 20190096281 A | 8/2019 |
| KR | 20190116067 A | 10/2019 |
| KR | 20200044661 A | 4/2020 |
| KR | 20200054720 A | 5/2020 |
| WO | 2020080665 A1 | 4/2020 |

\* cited by examiner (a)　　　　　　　　(b)

Interpolation model that directly generates inferred frame
$X_{t,pred} = g([X_{t-1}, X_{t+1}])$ (a)

$X_{t,pred} = mX_{t-1} + (1-m)X_{t+1}$

Interpolation model using mask
$m = g([X_{t-1}, X_{t+1}])$ (b)

$X_{t,pred} = X_{t-1}(x+v_x/2, y+v_y/2)$
$X_{t,pred} = X_{t+1}(x-v_x/2, y-v_y/2)$ Interpolation model using OF
$[V_x, V_y] = g([X_{t-1}, X_{t+1}])$ (c)

INTER PREDICTION METHOD BASED ON VARIABLE COEFFICIENT DEEP LEARNING

CROSS-REFERENCE TO RELATED APPLICATIONS

This application is a Continuation of International Application No. PCT/KR2021/013218, filed on Sep. 28, 2021, which claims priority to Korean Patent Application No. 10-2020-0126111 filed on Sep. 28, 2020, and Korean Patent Application No. 10-2021-0127795 filed on Sep. 28, 2021, the entire disclosures of each of which are incorporated herein by reference.

TECHNICAL FIELD

The present disclosure relates to an inter prediction method based on variable coefficient deep learning included in a video encoding or decoding apparatus.

BACKGROUND

The descriptions below provide only the background information related to the present disclosure and do not constitute the prior art.

Since video data has a large amount of data compared to audio or still image data, it requires a lot of hardware resources, including memory, to store or transmit the video data without processing for compression.

Accordingly, an encoder is generally used to compress and store or transmit video data, and a decoder receives the compressed video data, decompresses the received and compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since image size, resolution, and frame rate gradually increase, the amount of data to be encoded also increases. Accordingly, a new compression technique providing higher encoding efficiency and an improved image enhancement effect than existing compression techniques is required.

Recently, a deep learning-based video processing technology is being applied to an existing encoding element technology. The deep learning-based video processing technology is applied to a compression technology, such as inter prediction, intra prediction, in-loop filter, or transform among existing encoding technologies. Thus, encoding efficiency may be improved. Representative application examples include inter prediction based on a virtual reference frame generated on the basis of a deep learning model, and in-loop filter based on an image restoration model (see Non-patent literature 1: Lee et al., Deep Video Prediction Network Based Inter-Frame Coding in HEVC, IEEE Access 2020). Therefore, in video encoding or decoding, it is necessary to consider continuous application of the deep learning-based video processing technology in order to improve encoding efficiency.

SUMMARY

An object of the present disclosure is to provide an inter prediction method for causing a variable coefficient deep learning model to adaptively learn characteristics of a video, transmitting a parameter of a variable coefficient deep learning model generated from learning from a video encoding apparatus to a video decoding apparatus, and referring to a virtual reference frame generated by the variable coefficient deep learning model.

According to an embodiment of the present disclosure, a video decoding method performed by a video decoding apparatus comprises decoding variable coefficient values, an affine prediction flag, and an encoding mode from a bitstream. The affine prediction flag indicates whether affine motion prediction is applied to a current block, and the encoding mode is an encoding mode for motion information of the current block and indicates a merge mode or an advanced motion vector prediction (AMVP) mode. The method further comprises generating a virtual reference frame on the basis of reference frames by using an interpolation model. A variable coefficient network included in the interpolation model is set with the variable coefficient values. The method further comprises generating a merge candidate of the current block on the basis of the virtual reference frame and the reference frames when the encoding mode is the merge mode.

According to another embodiment of the present disclosure, a video encoding method performed by a video encoding apparatus comprises acquiring previously generated variable coefficient values and a preset encoding mode, wherein the encoding mode is an encoding mode for motion information of a current block and indicates a merge mode or an advanced motion vector prediction (AMVP) mode. The method further comprises generating a virtual reference frame from reference frames by using an interpolation model, wherein a variable coefficient network included in the interpolation model is set with the variable coefficient values. The method further comprises generating a merge candidate of the current block on the basis of the virtual reference frame and the reference frames when the encoding mode is the merge mode.

According to another embodiment of the present disclosure, a video encoding apparatus comprises an entropy decoder configured to decode variable coefficient values and an encoding mode from a bitstream. The encoding mode is an encoding mode for motion information of a current block and indicates a merge mode or an advanced motion vector prediction (AMVP) mode. The apparatus further comprises a virtual frame generator configured to generate a virtual reference frame from reference frames using an interpolation model, wherein a variable coefficient network included in the interpolation model is set with the variable coefficient values. The apparatus further comprises an inter predictor configured to generate a merge candidate of the current block on the basis of the virtual reference frame and the reference frames when the encoding mode is the merge mode.

As described above, according to the present embodiment, it is possible to increase effects of inter prediction and improve coding efficiency by providing the inter prediction method referring to the virtual reference frame generated by the variable coefficient deep learning model.

DETAILED DESCRIPTION

Figure 1:
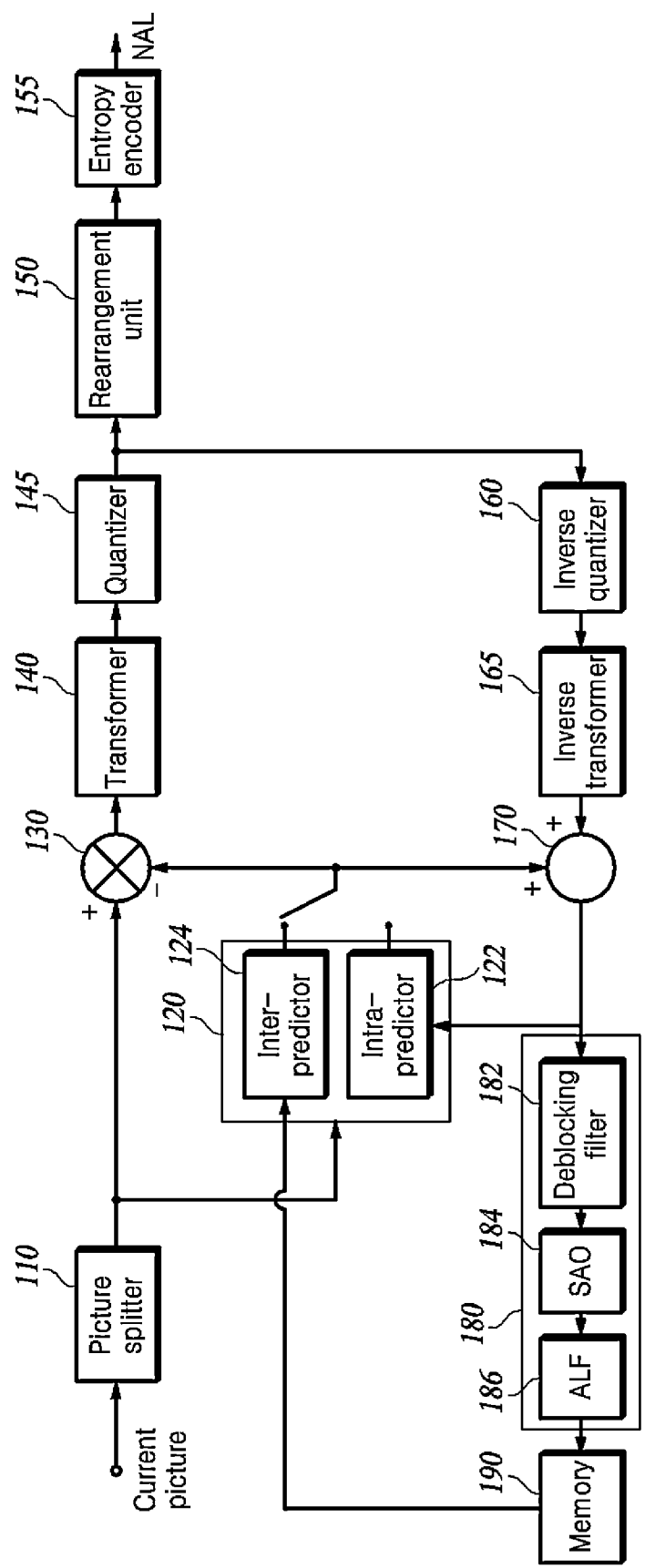
FIG. 1 is a block diagram of a video encoding apparatus that may implement the techniques of the present disclosure.

Hereinafter, embodiments of the present disclosure are described in detail with reference to drawings. When reference numerals refer to components of each drawing, it should be noted that although the same or equivalent components are illustrated in different drawings, the same or equivalent components may be denoted by the same reference numerals. Further, in describing the embodiments, a detailed description of known related configurations and functions has been omitted to avoid unnecessarily obscuring the subject matter of the embodiments.

FIG. 1 is a block diagram for a video encoding apparatus, which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information (CTU size) on the size of the CTU is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
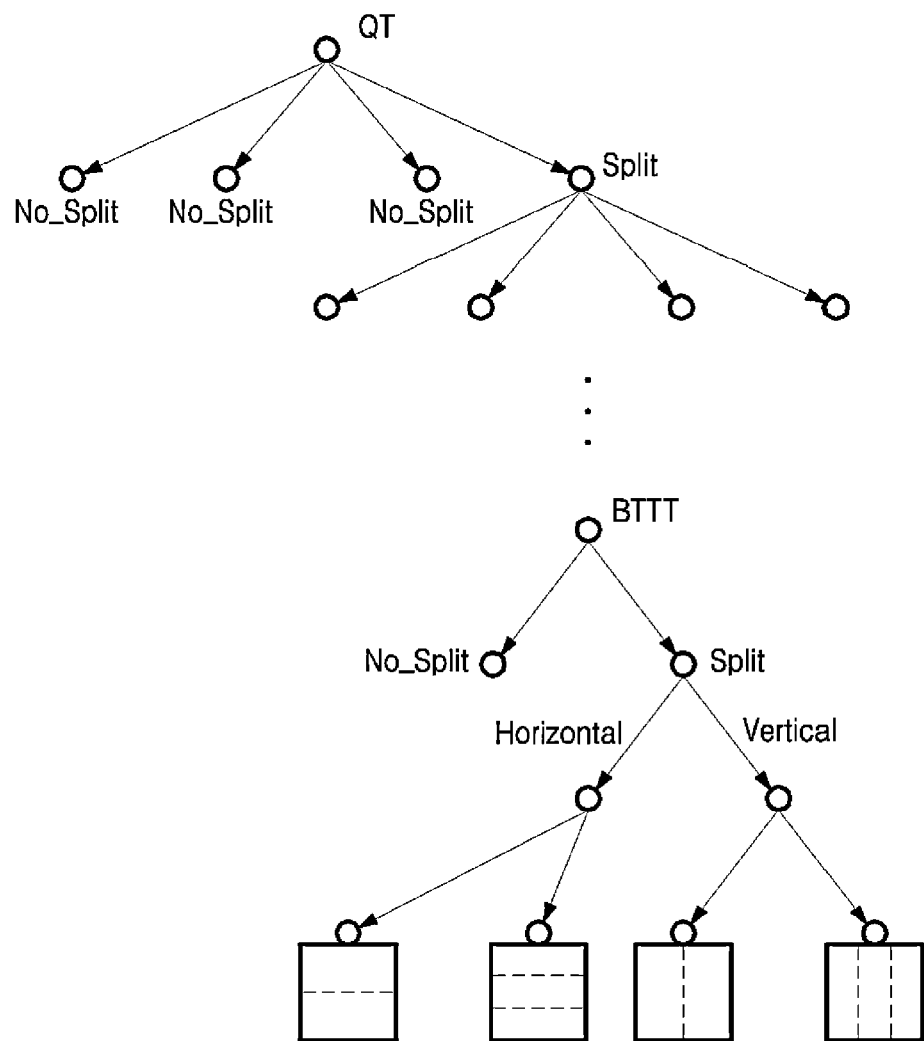
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the coding unit (CU), which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
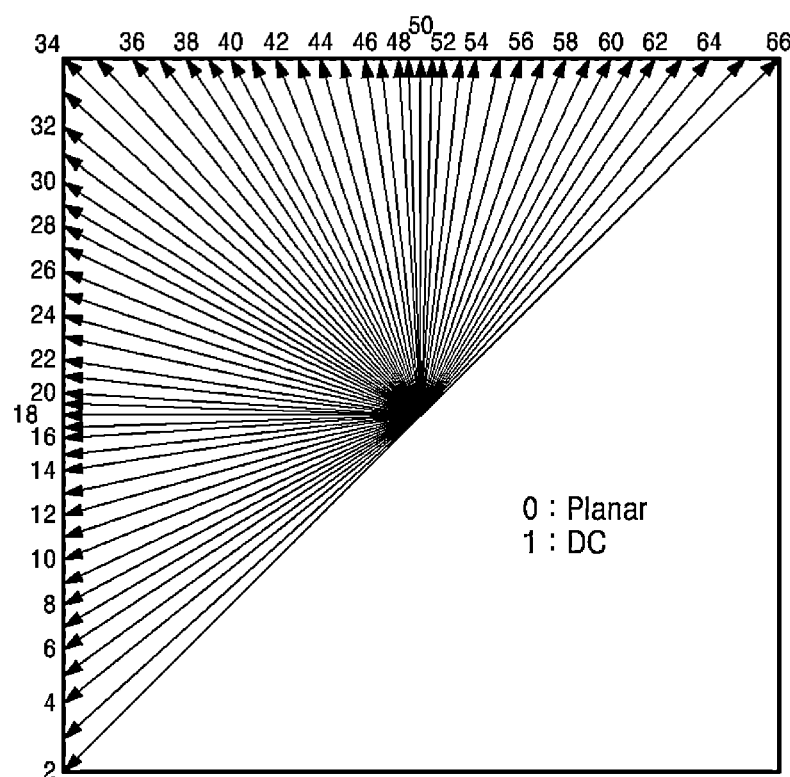
FIGS. 3A and 3B illustrate a plurality of intra prediction modes including wide-angle intra prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
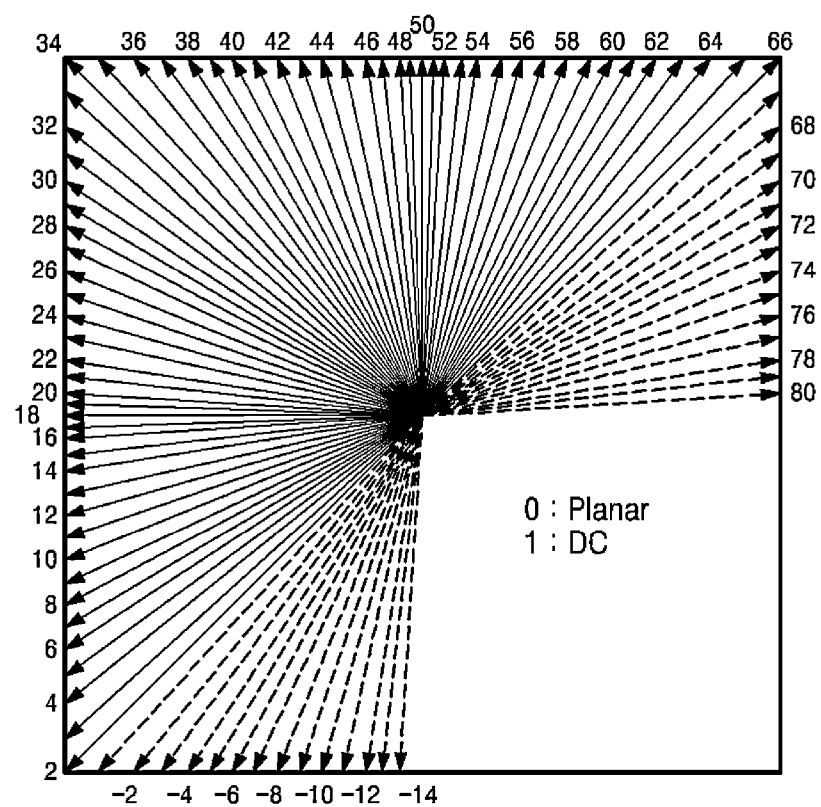

For efficient directional prediction for the current block having the rectangular shape, directional modes (#67 to #80, intra prediction modes #−1 to #−44) illustrated as dotted arrows in FIG. 3B may be additionally used. The direction modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
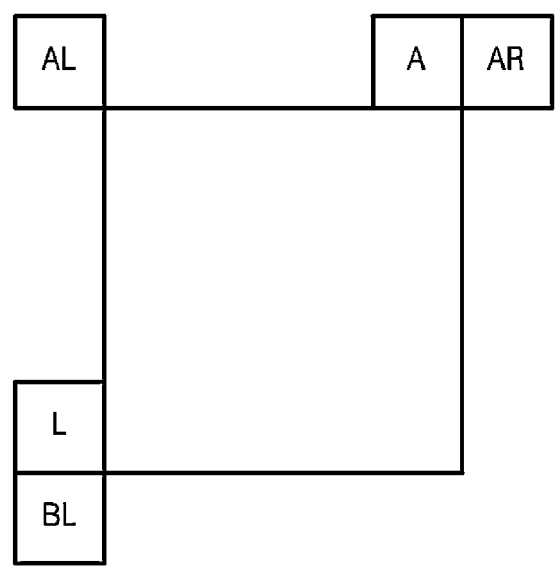
FIG. 4 illustrates neighboring blocks of a current block.

As a neighboring block for deriving the merge candidate, all or some of a left block A0, a bottom left block A1, a top block B0, a top right block B1, and a top left block A2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block L, a top block A, a top right block AR, a bottom left block BL, and a top left block AL adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis), and in this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (motion information encoding mode (merge mode or AMVP mode), in the case of the merge mode, a merge index, and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
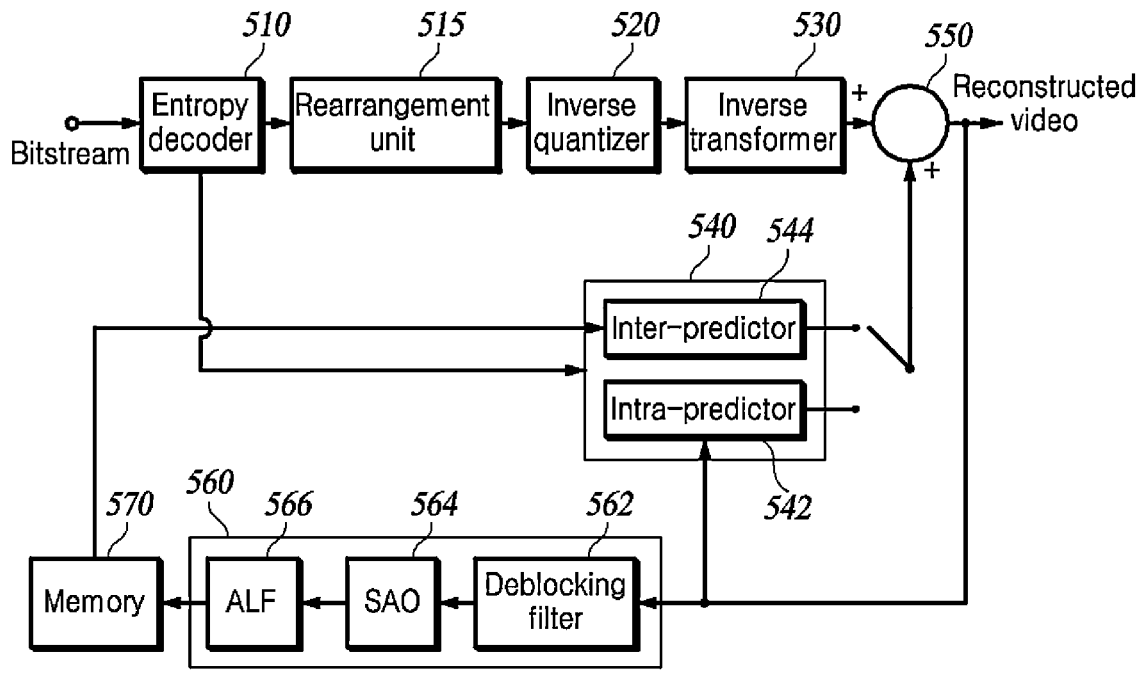
FIG. 5 is a block diagram of a video decoding apparatus that may implement the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT is extracted, and split direction information is extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_jdx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using adjacent reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit output from the inverse transform unit and the prediction block output from the inter predictor or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to encoding and decoding of a video as described above. More specifically, the present embodiment provides an inter prediction method in which a variable coefficient deep learning model is trained to adaptively learn characteristics of a video, parameters of a variable coefficient deep learning model generated by the training is transmitted from a video encoding apparatus to a video decoding apparatus, and a virtual reference frame generated by the variable coefficient deep learning model is referred to.

The following embodiments may be performed by the inter predictor 124 of the video encoding apparatus and the inter predictor 544 of the video decoding apparatus. Hereinafter, a term "target block" may be used in the same meaning as a current block or a coding unit (CU) as described above, or may mean a partial region of the coding unit.

I. Bi-Directional Optical Flow (BDOF)

A bi-directional optical flow (bi-directional OF: BDOF) is a technique for additionally compensating for motions of samples predicted using bidirectional motion prediction on the basis of the optical flow (OF) under the assumption that samples or objects constituting a video move at a constant speed and there is little change in sample value.

Figure 6:
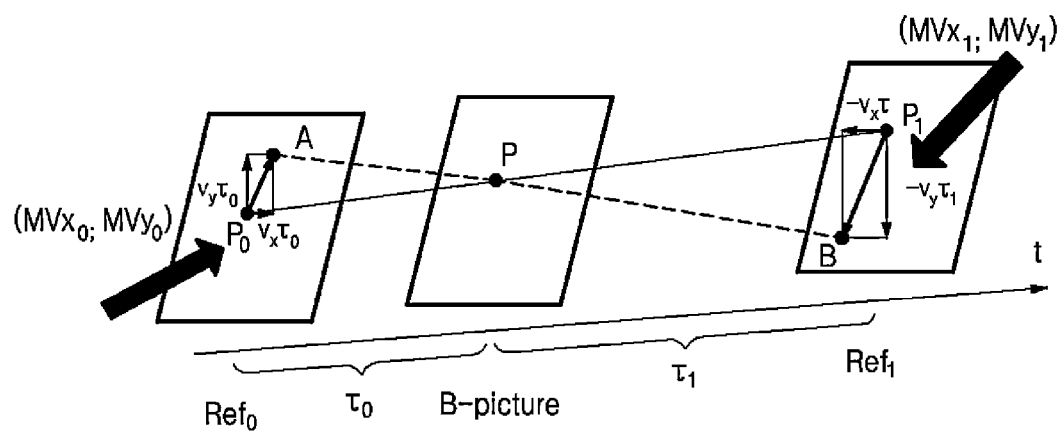
FIG. 6 is an illustrative diagram illustrating a concept of a bi-directional OF (BDOF) according to an embodiment of the present disclosure.

It is assumed that bidirectional motion vectors $MV_0$ and $MV_1$ pointing to corresponding regions (i.e., the reference blocks) most similar to the target block to be encoded of the current picture in reference pictures $Ref_0$ and $Ref_1$ have been determined as illustrated in FIG. 6 by (normal) bi-directional motion prediction for the target block. In this case, the two motion vectors are values indicating a motion of the entire target block. In the example of FIG. 6, a sample in the reference picture $Ref_0$ indicated by the motion vector $MV_0$ corresponding to a sample P in the target block is $P_0$, and a sample in the reference picture $Ref_1$ indicated by the motion vector $MV_1$ corresponding to the sample P in the target block is $P_1$.

Hereinafter, it is assumed in the example of FIG. 6 that a motion of the sample P is slightly different from an overall motion of the target block. For example, when an object located at a sample A in $Ref_0$ passes through the sample P in the target block of the current picture and moves to a sample B in $Ref_1$, the sample A and the sample B should have very similar values. Therefore, a point in $Ref_0$ most similar to the sample P in the target block is not $P_0$ indicated by the motion vector $MV_0$, but A obtained by moving $P_0$ by a predetermined displacement vector $(v_x t_0, v_y t_0)$. Further, a point in $Ref_1$ most similar to the sample P in the target block is not $P_1$ indicated by the motion vector $MV_1$, but B obtained by moving $P_1$ by a predetermined displacement vector $(-v_x t_1, -v_y t_1)$. Here, $t_0$ and $t_1$ mean time axis distances for $Ref_0$ and $Ref_1$ with reference to the current picture respectively and are calculated on the basis of a picture order count (POC). In this case, $(v_x, v_y)$ is referred to as OF. Accordingly, OF represents a motion vector in units of pixels representing a motion of a pixel occurring between pictures.

In the BDOF, when a value of the sample P of the target block in the current picture is predicted, more accurate prediction is performed by using values of the two reference samples A and B as compared to using the reference samples $P_0$ and $P_1$ indicated by the bidirectional motion vectors $MV_0$ and $MV_1$, i.e., prediction samples.

A value of a prediction sample in the reference picture $Ref_0$ indicated by the motion vector $MV_0$ corresponding to a (luma) pixel (x, y) in the target block is defined as $I^{(0)}_{(x, y)}$, and a value of a prediction sample in the reference picture $Ref_1$ indicated by the motion vector $MV_1$ corresponding to a sample (x, y) in the target block is defined as $I^{(1)}_{(x, y)}$.

A value of the sample A in the reference picture $Ref_0$ corresponding to the sample in the target block indicated by a BDOF motion vector $(v_x, v_y)$ may be defined as $I^{(0)}(i+v_x t_0, j+v_y t_0)$, and a value of the sample B in the reference picture $Ref_1$ can be defined as $I^{(1)}(i-v_x t_1, j-v_y t_1)$. Further, when it is assumed that times $t_0$ and $t_1$ are the same and normalization is performed using '$t_0+t_1$', the value of the sample A can be defined as $I^{(0)}(i+½v_x, j+½v_y)$, and the value of the sample B can be defined as $I^{(1)}(i+½v_x, j+½v_y)$ In the BDOF, a pixel value of the target block can be predicted, as shown in Equation 1, using values of prediction samples for pixels, the OF, and a gradient in the prediction samples.

$$\text{pred}(x,y)=(I^{(0)}(x,y)+I^{(1)}(x,y)+b(x,y)+o_{\textit{offset}})\!\!>\!\!>\!\text{shift} \quad [\text{Equation 1}]$$

Here, the values of prediction samples for the pixels are predicted on the basis of motion information (i.e., two motion vectors and two reference pictures) used for bi-directional prediction of inter prediction. "b(x, y)" is a sample offset calculated using the OF and the gradient in the prediction sample. The shift is a scaling factor, and $o_{\textit{offset}}$ is a value for a rounding-off operation and is a half of the shift.

II. Merge and Skip Modes of Inter Prediction

Hereinafter, a method of constructing a merge candidate list for motion vectors in the merge or skip mode of the inter prediction is described referring to a flowchart illustrated in FIG. 7. To support the merge mode, the inter predictor 124 may select a preset number of (for example, six) merge candidates and construct the merge candidate list.

Figure 7:
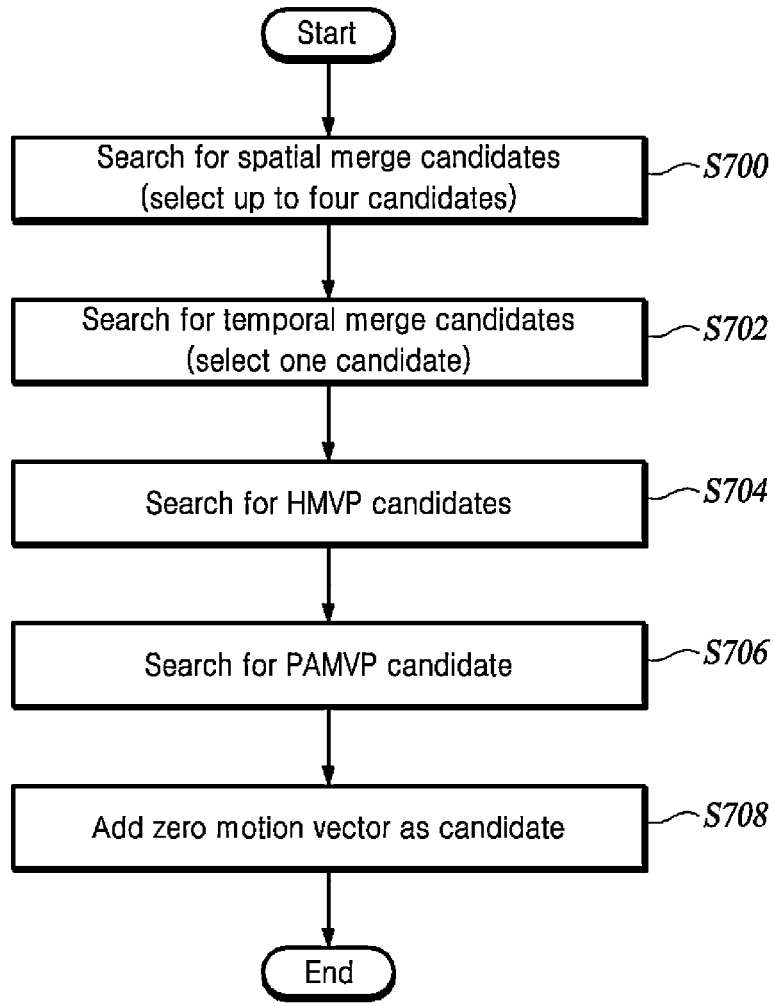
FIG. 7 is a flowchart illustrating a process of searching for motion vector candidates in a merge or skip mode according to an embodiment of the present disclosure.

FIG. 7 is a flowchart illustrating a process of searching for candidates for a motion vector in the merge or the skip mode according to an embodiment of the present disclosure.

The inter predictor 124 searches for spatial merge candidates (S700). The inter predictor 124 searches for the spatial merge candidates from neighboring blocks as illustrated in FIG. 4. Up to four spatial merge candidates can be selected.

The inter predictor 124 searches for a temporal merge candidate (S702). The inter predictor 124 may add, as the temporal merge candidate, a co-located block of the current block within the reference picture (which may be the same as or different from the reference picture used for prediction of the current block) other than the current picture in which the current block is located. One temporal merge candidate may be selected.

The inter predictor 124 searches for history-based motion vector predictor (HMVP) candidates (S704). The inter predictor 124 may store motion vectors of previous n (where n is a natural number) CUs in a table and then use these as merge candidates. A size of the table may be 6, and the motion vectors of the previous CUs may be stored according to a first-in first out (FIFO) scheme. This indicates that up to 6 HMVP candidates are stored in the table. The inter predictor 124 may set recent some motion vectors among the HMVP candidates stored in the table as merge candidates.

The inter predictor 124 searches for a pairwise average MVP (PAMVP) candidate (S706). The inter predictor 124 may set an average of motion vectors of a first candidate and a second candidate in the merge candidate list as a new merge candidate.

When the merge candidate list cannot be filled even when all of the above processes (S700 to S706) have been performed (i.e., when a preset number cannot be filled), the inter predictor 124 adds a zero motion vector as a remaining merge candidate (S708).

III. Affine Motion Prediction

The inter prediction as described above is motion prediction reflecting a translational motion model. In other words, the inter prediction is a scheme for predicting a motion in a horizontal direction (x-axis direction) and a vertical direction (y-axis direction). However, in reality, there may be various types of motions, such as rotation, zoom-in, or zoom-out, in addition to the translational motion. One aspect according to the present embodiment provides affine motion prediction that can reflect such various types of motions.

Figure 8:
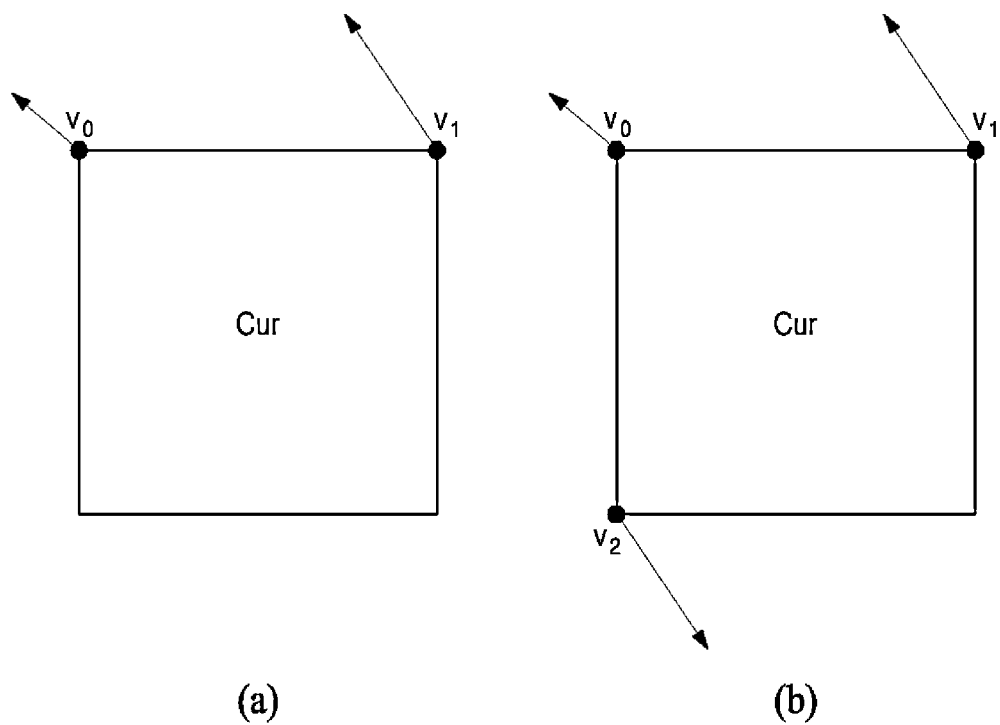
FIG. 8 is an illustrative diagram illustrating affine motion prediction according to an embodiment of the present disclosure.

FIG. 8 is an illustrative diagram illustrating the affine motion prediction according to an embodiment of the present disclosure.

There may be two types of models for the affine motion prediction. One of the models uses two control point motion vectors (CPMVs) of a top-left corner and a top-right corner of a target block to be currently encoded, i.e., uses four parameters, as illustrated in (a) of FIG. 8. Another model uses three control point motion vectors of the top-left corner, the top-right corner, and a bottom-left corner of the target block, i.e., uses six parameters, as illustrated in (b) of FIG. 8.

The 4-parameter affine model is expressed as shown in Equation 2. A motion at a sample position (x, y) in the target block can be calculated as shown in Equation 2. Here, a position of a top-left sample of the target block is assumed to be (0, 0).

$$\begin{cases} mv_x = \frac{mv_{1x} - mv_{0x}}{W}x - \frac{mv_{1y} - mv_{0y}}{W}y + mv_{0x} \\ mv_y = \frac{mv_{1y} - mv_{0y}}{W}x + \frac{mv_{1x} - mv_{0x}}{W}y + mv_{0y} \end{cases} \quad \text{[Equation 2]}$$

Further, the 6-parameter affine model is expressed as shown in Equation (3). The motion at the sample position (x, y) in the target block can be calculated as shown in Equation 3.

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{[Equation 3]}$$

Here, $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point. W is a horizontal length of the target block, and H is a vertical length of the target block.

The affine motion prediction may be performed on each sample in the target block using the motion vector calculated according to Equation 2 or Equation 3.

Figure 9:
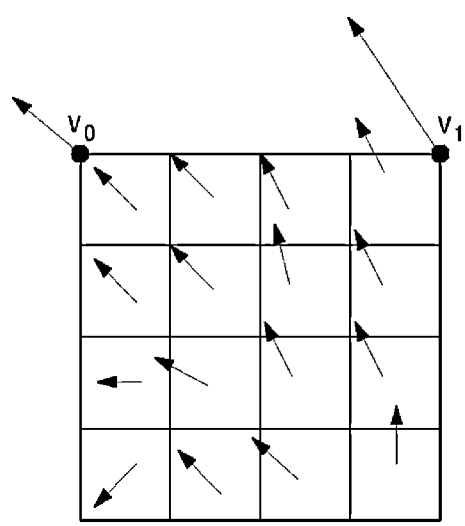
FIG. 9 is an illustrative diagram illustrating affine motion prediction in units of subblocks according to an embodiment of the present disclosure.

Alternatively, the affine motion prediction may be performed in units of subblocks divided from the target block, as illustrated in FIG. 9, in order to reduce computational complexity. A size of the subblock may be, e.g., 4×4, 2×2, or 8×8. Hereinafter, an example in which the affine motion prediction is performed on the target block in units of subblocks (4×4) is described. This example is only for convenience of description and does not limit the scope of the present disclosure.

In the affine motion prediction in units of subblocks, a motion vector (affine motion vector) of each subblock is calculated by substituting a center position of each subblock into (x, y) in Equation 2 or 3. Here, the center position may be an actual center point of the subblock or may be a position of a bottom-right sample of the center point. For example, in the case of a 4×4 subblock in which coordinates of a top-left sample are (0, 0), the center position of the subblock may be (1.5, 1.5) or (2, 2). A prediction block for each subblock is generated using an affine motion vector $(mv_x, mv_y)$ of the subblock.

The motion vector $(mv_x, mv_y)$ may be set to have 1/16 sample precision. In this case, the motion vector $(mv_x, mv_y)$ calculated according to Equation 2 or Equation 3 may be rounded off in units of 1/16 samples.

The affine motion prediction may be performed not only on a luma component, but also on a chroma component. In the case of a 4:2:0 video format, when the affine motion prediction is performed on the luma component in units of 4×4 subblocks, the affine motion prediction may be performed on the chroma component in units of 2×2 subblocks. The motion vector $(mv_x, mv_y)$ of each subblock of the chroma component may be derived from a motion vector of the corresponding luma component. Alternatively, a size of a subblock for the affine motion prediction of the chroma component may be the same as that of the luma component. When the affine motion prediction has been performed on the luma component in units of 4×4 subblocks, the affine motion prediction is performed on the chroma component in units of 4×4 subblocks. In this case, since the 4×4 subblocks of the chroma component corresponds to four 4×4 subblocks of the luma component, the motion vector $(mv_x, mv_y)$ of the subblock of the chroma component can be calculated from an average of motion vectors of the four corresponding subblocks of the luma component.

The video encoding apparatus selects an optimal prediction method by performing intra prediction, inter prediction (translational motion prediction), affine motion prediction, and the like, and calculating a rate-distortion (RD) cost. To perform the affine motion prediction, the inter predictor 124 of the video encoding apparatus determines which of the two types of models is to be used and determines two or three control points according to the type of model. The inter predictor 124 calculates the motion vector $(mv_x, mv_y)$ of each of the 4×4 subblocks in the target block using the motion vectors of the control points. The inter predictor 124 generates the prediction block for each subblock in the target block by performing motion compensation within the reference picture in units of subblocks using the motion vector ($mv_x, mv_y$) of each subblock.

The entropy encoder 155 of the video encoding apparatus encodes affine-related syntax elements including, for example, a flag indicating whether or not the affine motion prediction is applied to the target block, type information indicating a type of affine model, and motion information indicating the motion vector of each control point. The entropy encoder 155 of the video encoding apparatus transmits the affine-related syntax elements to the video decoding apparatus. The type information and the motion information of the control points may be signaled when the affine motion prediction is performed, and the motion vectors of the control points may be signaled as many as the number determined according to the type information.

The video decoding apparatus determines the type of the affine model and the control point motion vectors using the signaled syntaxes and calculates the motion vector ($mv_x$, $mv_y$) for each 4×4 subblock in the target block using Equation 2 or Equation 3. When motion vector resolution information for the affine motion vector of the target block is signaled, the motion vector ($mv_x$, $mv_y$) is modified to have the precision identified by the motion vector resolution information using an operation such as rounding-off.

The video decoding apparatus generates the prediction block for each subblock by performing motion compensation within the reference picture using the motion vector ($mv_x$, $mv_y$) for each subblock.

In order to reduce the number of bits required to encode the motion vectors of the control points, a general intra prediction (i.e., translational motion prediction) scheme as described above may be applied.

As an example, in the case of the merge mode, the inter predictor 124 of the video encoding apparatus constructs affine merge candidate lists having a predefined number of (for example, five) candidates. First, the inter predictor 124 of the video encoding apparatus derives inherited affine merge candidates from neighboring blocks of the target block. For example, the inter predictor 124 derives a predefined number of inherited affine merge candidates from neighboring samples A0, A1, B0, B1, and B2 of the target block illustrated in FIG. 4 to generate the merge candidate list. Each of the inherited affine merge candidates included in the candidate list corresponds to a set of two or three CPMVs.

The inter predictor 124 derives the inherited affine merge candidates from the control point motion vectors of the neighboring blocks having been predicted in the affine mode among the neighboring blocks adjacent to the target block. In some embodiments, the number of merge candidates derived from the neighboring blocks predicted in the affine mode may be limited. For example, the inter predictor 124 may derive a total of two inherited affine merge candidates, one from A0 and A1 and one from B0, B1 and B2, from the neighboring blocks having been predicted in the affine mode. A priority may be an order of A0 and A1, and may be an order of B0, B1, and B2.

Meanwhile, when a total number of merge candidates is three or more, the inter predictor 124 may derive as many "constructed affine merge candidates" as a lacking number from translational motion vectors of neighboring blocks.

Figure 10:
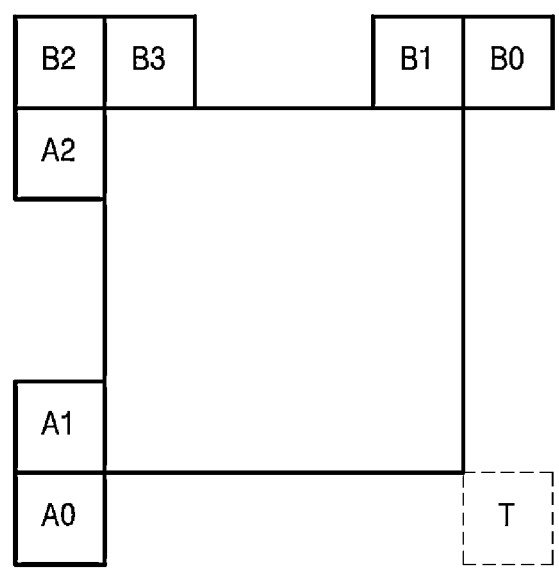
FIG. 10 is an illustrative diagram illustrating a method of deriving merge candidates for affine motion prediction from translational motion vectors of neighboring blocks.

FIG. 10 is an illustrative diagram illustrating a method of deriving the constructed affine merge candidates for the affine motion prediction from the translational motion vectors of the neighboring blocks.

The inter predictor 124 derives control point motion vectors CPMV1, CPMV2, and CPMV3 from the neighboring block group {B2, B3, and A2}, the neighboring block group {B1 and B0}, and the neighboring block group {A1 and A0}, respectively. As an example, a priority within each neighboring block group may be an order of B2, B3, and A2, an order of B1 and B0, and an order of A1 and A0. Further, another control point motion vector CPMV4 is derived from a collocated block T in the reference picture. The inter predictor 124 combines two or three control point motion vectors among four control point motion vectors to generate as many constructed affine merge candidates as the lacking number. A priority of combinations is as follows. Elements in each group are arranged in an order of the top-left corner, top-right corner, and bottom-left corner point motion vectors.

{CPMV1, CPMV2, CPMV3}, {CPMV1, CPMV2, CPMV4}, {CPMV1, CPMV3, CPMV4},

{CPMV2, CPMV3, CPMV4}, {CPMV1, CPMV2}, {CPMV1, CPMV3}

When the merge candidate list cannot be filled only using the inherited affine merge candidate and the constructed affine merge candidate, the inter predictor 124 may add a zero motion vector as a candidate.

The inter predictor 124 selects the merge candidate from the merge candidate list and performs the affine motion prediction on the target block. When the selected candidate consists of two control point motion vectors, inter predictor 124 performs the affine motion prediction using a 4-parameter model. On the other hand, when the selected candidate consists of three control point motion vectors, the affine motion prediction is performed using a 6-parameter model. The entropy encoder 155 of the video encoding apparatus encodes index information indicating a merge candidate selected from among the merge candidates in the merge candidate list and signals the index information to the video decoding apparatus.

The entropy decoder 510 of the video decoding apparatus decodes the index information signaled from the video encoding apparatus. The inter predictor 544 of the video decoding apparatus constructs a merge candidate list as in the video encoding apparatus and performs the affine motion prediction using the control point motion vectors corresponding to merge candidates indicated by the index information.

As another example, in the case of the AMVP mode, the inter predictor 124 of the video encoding apparatus determines the type of affine model and control point motion vectors for the target block. The inter predictor 124 calculates a motion vector difference, which is a difference between actual control point motion vectors of the target block and the predicted motion vectors of the respective control points, and encodes and transmits the motion vector difference for each control point. To this end, the inter predictor 124 of the video encoding apparatus constructs a predefined number of (for example, two) affine AMVP candidate lists. When the target block is a 4-parameter type, each of the candidates included in the list consist of a pair of two control point motion vectors. On the other hand, when the target block is a 6-parameter type, each of the candidates included in the list consist of a set of three control point motion vectors.

Hereinafter, a method of constructing a candidate list in the affine AMVP mode of inter prediction is described using an example of FIG. 11. The affine AMVP candidate list can be derived similarly to the method of constructing the affine merge candidate list described above.

Figure 11:
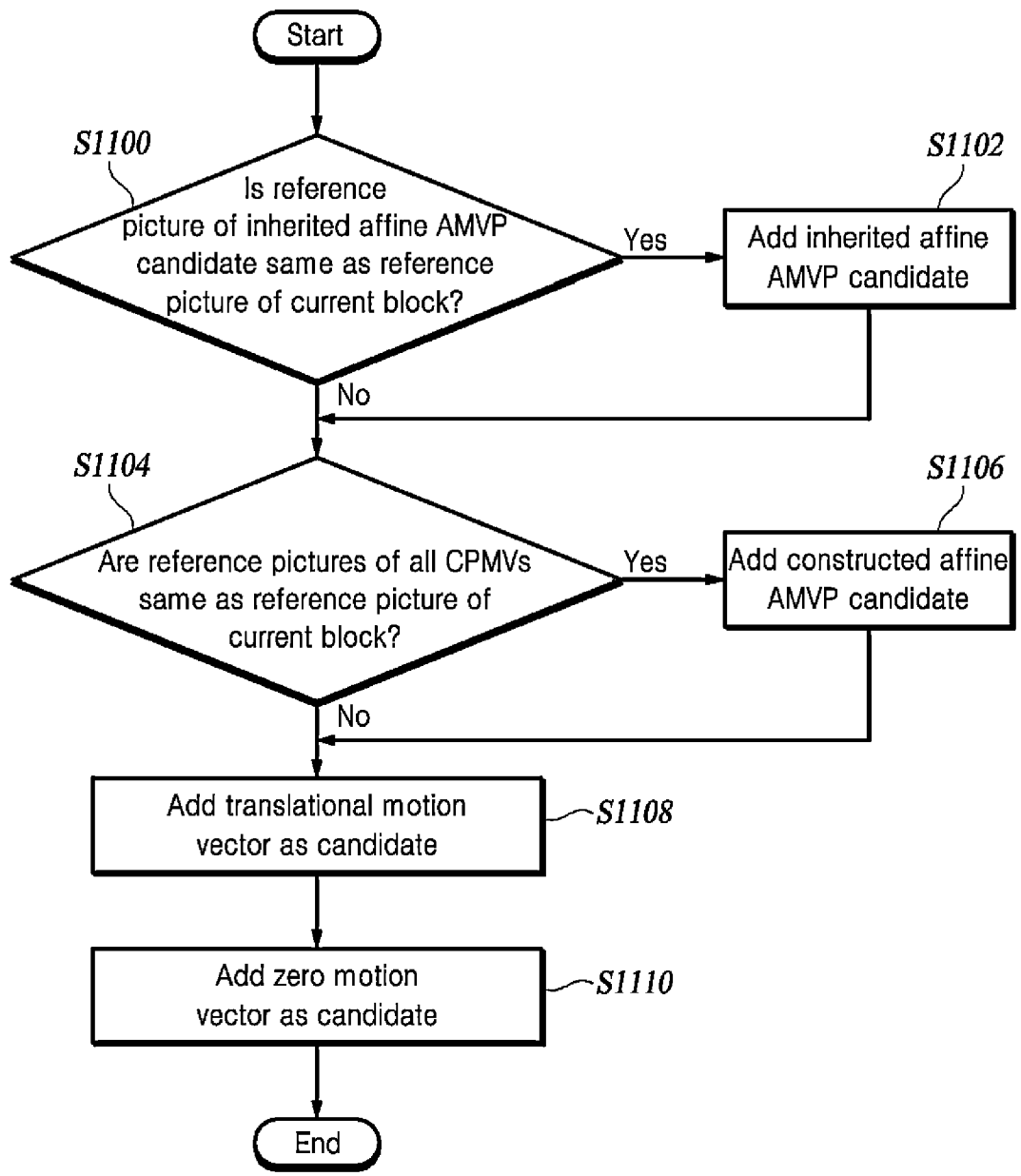
FIG. 11 is a flowchart illustrating a process of searching for an affine advanced motion vector prediction (AMVP) candidate in an affine AMVP mode according to an embodiment of the present disclosure.

FIG. 11 is a flowchart illustrating a process of searching for an affine AMVP candidate in the affine AMVP mode according to an embodiment of the present disclosure.

The inter predictor 124 checks whether a reference picture of an inherited affine AMVP candidate is the same as a reference picture of the current block (S1100). Here, the inherited affine AMVP candidate may be a block having been predicted in an affine mode among the neighboring blocks A0, A1, B0, B1, and B2 of the target block illustrated in FIG. 4, as in the above-described affine merge mode.

When the reference picture of the inherited affine AMVP candidate is the same as the reference picture of the current block (Yes in S1100), the inter predictor 124 adds the inherited affine AMVP candidate (S1102).

When the reference picture of the inherited affine AMVP candidate is not the same as the reference picture of the current block (No in S1100), the inter predictor 124 checks whether the reference pictures of all CPMVs of the constructed affine AMVP candidate are the same as the reference picture of the current block (S1104). Here, all the CPMVs of the constructed affine AMVP candidates can be derived from motion vectors of neighboring samples illustrated in FIG. 10, as in the above-described affine merge mode.

When the reference pictures of all the CPMVs of the constructed affine AMVP candidates are the same as the reference picture of the current block (Yes in S1104), the inter predictor 124 adds the constructed affine AMVP candidate (S1106).

In this case, an affine model type of the target block should be considered. When the affine model type of the target block is the 4-parameter type, the video encoding apparatus derives two control point motion vectors (the top-left and top-right corner point motion vectors of the target block) using an affine model of the neighboring block. When the affine model type of the target block is a 6-parameter type, three control point motion vectors (the top-left, top-right, and bottom-left corner control point motion vectors of the target block) are derived using the affine model of the neighboring block.

When the neighboring block is the 4-parameter type, two or three control point motion vectors are predicted according to the affine model type of the target block using the two control point motion vectors of the neighboring block. For example, the affine model of the neighboring block expressed by Equation 2 may be used. In Equation 2, ($mv_{0x}$, $mv_{0y}$) and ($mv_{1x}$, $mv_{1y}$) are replaced with the top-left corner and top-right control point motion vectors of neighboring blocks, respectively. The predicted motion vector for each control point of the target block can be derived by inputting a difference between the position of the control point of the target block and the top-left corner position of the neighboring block to (x, y) into Equation 2.

When the neighboring block is the 6-parameter type, two or three control point motion vectors are predicted according to the affine model type of the target block using the three control point motion vectors of the neighboring block. For example, the affine model of the neighboring block expressed by Equation 3 may be used. In Equation 3, ($mv_{0x}$, $mv_{0y}$), ($mv_{1x}$, $mv_{1y}$), and ($mv_{2x}$, $mv_{2y}$) are replaced with the top-left, top-right, and bottom-left corner control point motion vectors of the neighboring blocks, respectively. The predicted motion vector for each control point of the target block can be derived by inputting the difference between the position of the control point of the target block and the top-left corner position of the neighboring block to (x, y) into Equation 3.

When the reference pictures of all the CPMVs is not the same as the reference picture of the current block (No in S1104), the inter predictor 124 adds the translational motion vector as the affine AMVP candidate (S1108). The translational motion vectors may be used for prediction of the CPMV of the current block in an order of mv0, mv1, and mv2.

In a case in which the candidate list cannot be filled even when all of the above steps (S1100 to S1108) are performed (i.e., in a case where the preset number of candidates cannot be obtained), the inter predictor 124 adds the zero motion vector as the affine AMVP candidate (S1110).

The inter predictor 124 of the video encoding apparatus selects one candidate from an affine AMVP list and generates a motion vector difference between the motion vector of each actual control point and a predicted motion vector of a corresponding control point of the selected candidate. The entropy encoder 155 of the video encoding apparatus encodes the type information indicating the affine model type of the target block, the index information indicating the candidate selected from among the candidates in the affine AMVP list, and the motion vector difference corresponding to each control point, and transmits these to the video decoding apparatus.

The inter predictor 544 of the video decoding apparatus determines the affine model type using information signaled from the video encoding apparatus and generates the motion vector difference of each control point. The inter predictor 544 generates the affine AMVP list as in the video encoding apparatus and selects the candidate indicated by the signaled index information in the affine AMVP list. The inter predictor 544 of the video decoding apparatus adds the predicted motion vector of each control point of the selected candidate to the corresponding motion vector difference to calculate the motion vector of each control point.

IV. Creation of Virtual Reference Frame and Use in Inter Prediction Mode

Video prediction based on variable coefficient deep learning is double-loop coding and includes the following two-step process. The two steps include a first step in which a given video is analyzed on the basis of the variable coefficient deep learning model to acquire parameters of the deep learning model and include a second step in which the acquired parameters of the deep learning model are applied to a video prediction process and an encoded bitstream and parameters of the deep learning model are transmitted to use for video encoding and decoding.

In the first step, in order for parameters of a deep learning model related to video motion prediction to be adapted to individual videos, the video encoding apparatus trains the deep learning model by utilizing the individual videos as training data. For example, the deep learning model may be used to achieve one or more of refinement of a motion prediction signal of a video, achievement of precision of the motion vector, change in resolution of the motion vector, or improvement of the reference frame.

The deep learning model may be a combination of (a) layers including fixed coefficients and (b) one or more convolution layers including variable coefficients. The layers including fixed coefficients (hereinafter, referred to as a "fixed coefficient network") provide functions, such as motion prediction, motion interpolation, and motion extrapolation. Alternatively, convolutional layers including only the variable coefficient (hereinafter referred to as a variable coefficient network) may be used as a deep learning model. Any type of deep learning model is trained to adapt to individual videos, as described above.

In the second process, the video encoding apparatus and the video decoding apparatus perform refinement of the motion prediction signal, achievement of precision and super-resolution of the motion vector, improvement of a peak signal to noise ratio (PSNR) of the reference frame, or the like using the trained deep learning model. Utilization of the deep learning model for these functions can be controlled on a per-slice or per-sequence basis in a video. For example, a flag enabling the use of the deep learning model may be signaled in a sequence parameter set (SPS), a video parameter set (VPS), a picture parameter set (PPS), or a subpicture or tile of the video. Alternatively, a flag enabling the use of the deep learning model may be signaled on a per-block (i.e., per-CTU or per-CU) basis for the video. The video encoding apparatus transmits the encoded bitstream and values of variable coefficient of the deep learning model to the video decoding apparatus.

Since it may take a considerable amount of time to train the variable coefficient network of the deep learning model in the first step, it is difficult for the variable coefficient deep learning to be applied to fields in which low delay coding is required, such as real-time video conference or real-time streaming service. However, since it is possible to perform the first step in advance using a stored video, the variable coefficient deep learning can be easily applied to a field in which random access coding is used.

Now, an embodiment using a video interpolation model including the variable coefficient network as the deep learning model is described. Hereinafter the video interpolation model is also referred to as "a variable coefficient interpolation model" or "an interpolation model". As described above, the interpolation model may also include the fixed-coefficient network. A process of generating a virtual reference frame from reference frames using the interpolation model, a process of encoding a video using the virtual reference frame, and a process of decoding the video by transmitting the encoded bitstream and the variable coefficient deep learning model are described. However, a field to which the present disclosure is applied is not limited to the above-described case, and can be expanded by using the variable coefficient deep learning model for the refinement of the motion prediction signal and the achievement of precision of the motion vector.

With a video encoding apparatus and a video decoding apparatus, it is possible to obtain an encoding gain by including the virtual reference frame generated by the interpolation model in a reference picture list and then using the virtual reference frame for motion prediction in the merge mode and the AMVP mode. In particular, it is known that the coding efficiency increases as the virtual reference frame is similar to an original frame (see Non-Patent Document 1). When the virtual reference frame is generated, the video encoding apparatus or the video decoding apparatus can more easily generate a frame more similar to the original frame by using a variable coefficient interpolation model adaptively trained to be overfit on an input frame. Accordingly, in the present disclosure, a method for generating a virtual reference frame using a variable coefficient interpolation model as illustrated in FIGS. 12, 13, and 14 and increasing coding efficiency using the virtual reference frame is described.

Figure 12:
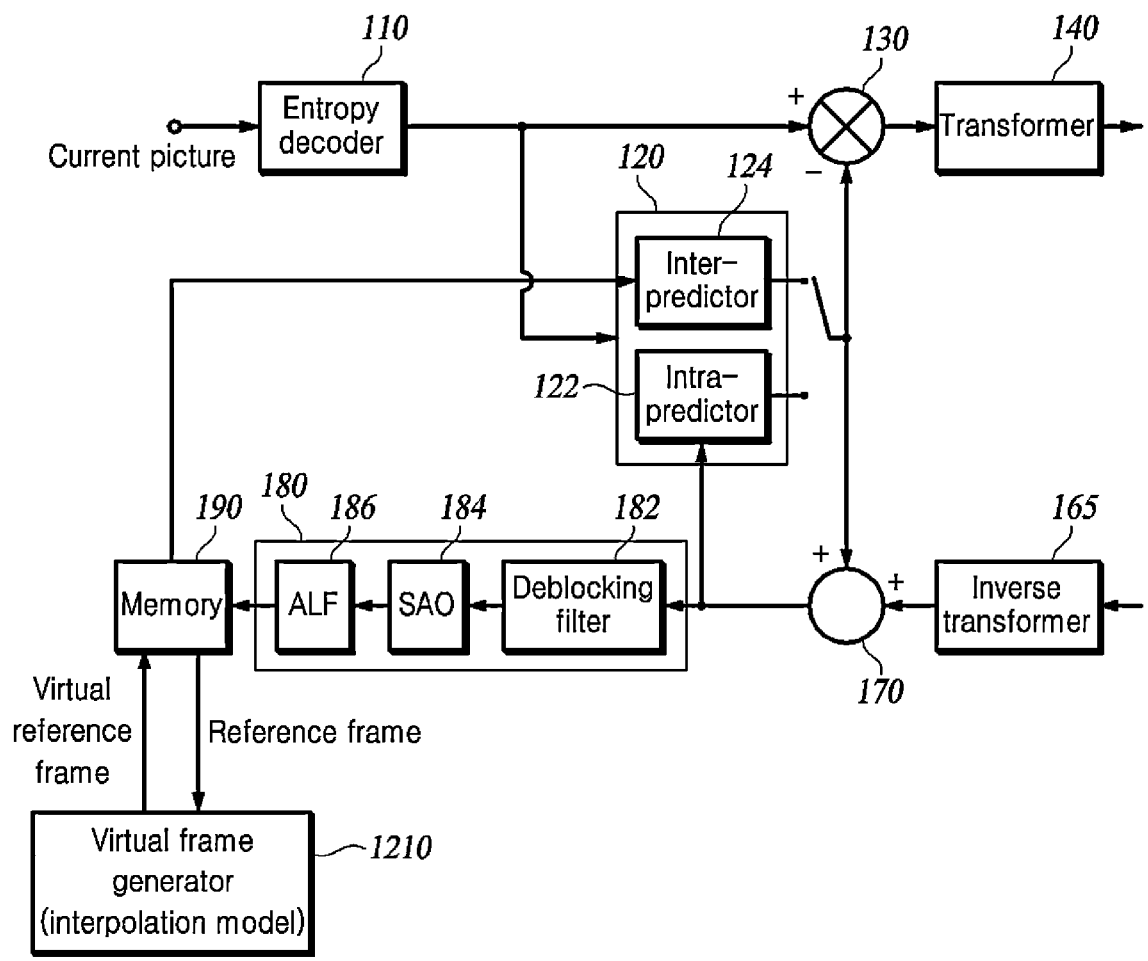
FIG. 12 is a block diagram illustrating a video encoding apparatus including an interpolation model according to an embodiment of the present disclosure.

FIG. 12 is a block diagram illustrating a video encoding apparatus including an interpolation model according to an embodiment of the present disclosure.

As illustrated in FIG. 12, the video encoding apparatus may include a virtual frame generator 1210 that generates a virtual reference frame from previously decoded adjacent reference frames stored in a memory 190. Here, the virtual frame generator 1210 includes the variable coefficient interpolation model. An operation of the interpolation model is described below.

Figure 13:
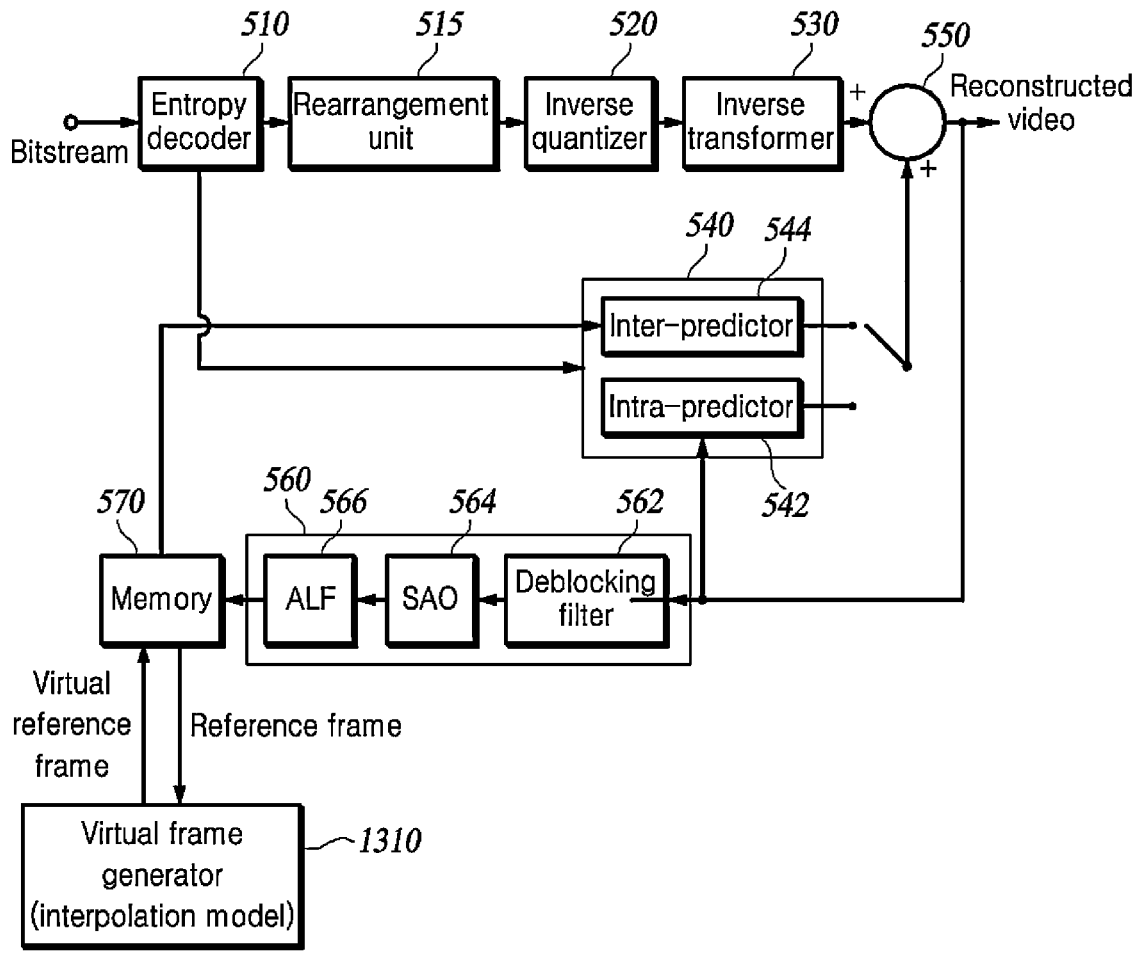
FIG. 13 is a block diagram illustrating a video decoding apparatus including an interpolation model according to an embodiment of the present disclosure.
Figure 14:
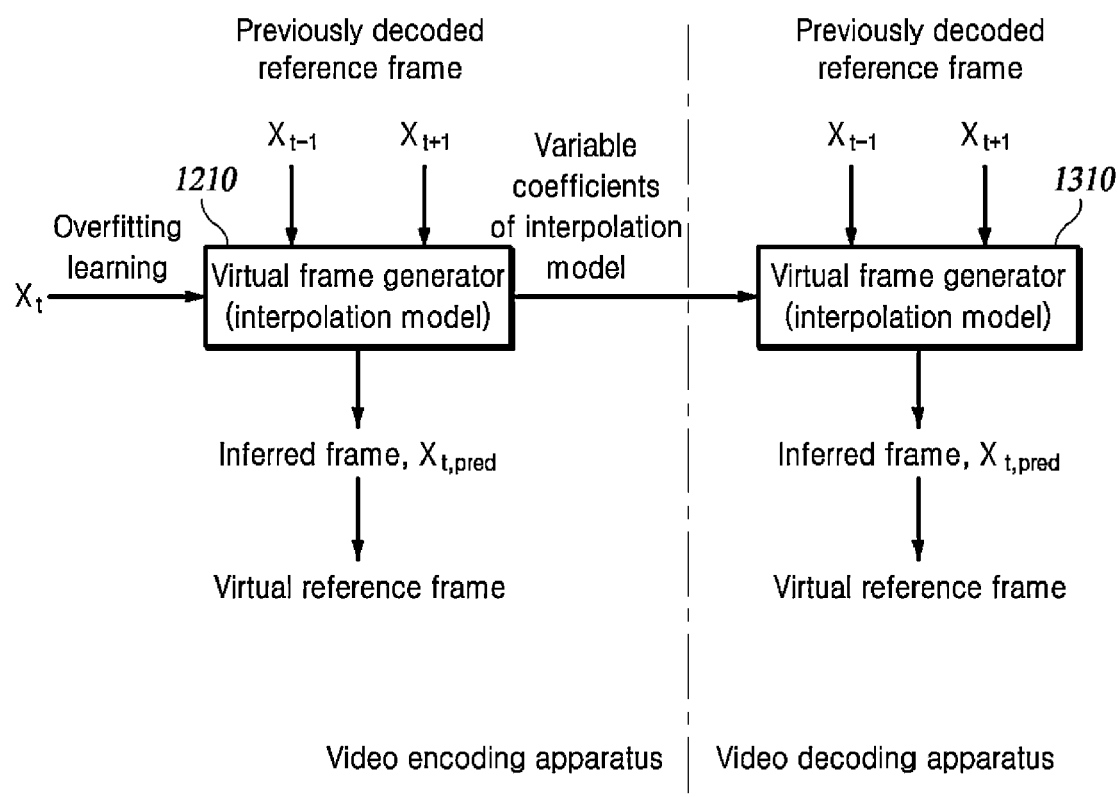
FIG. 14 is an illustrative diagram illustrating an operation of an interpolation model used in the video encoding apparatus and the video decoding apparatus according to an embodiment of the present disclosure.

FIG. 13 is a block diagram illustrating the video decoding apparatus including an interpolation model according to an embodiment of the present disclosure.

As illustrated in FIG. 13, the video decoding apparatus may include a virtual frame generator 1310 that generates a virtual reference frame from previously decoded adjacent reference frames stored in a memory 570. Here, the virtual frame generator 1310 includes the variable coefficient interpolation model. An operation of the interpolation model is described below.

FIG. 14 is an illustrative diagram illustrating the operation of the interpolation model used in the video encoding apparatus and the video decoding apparatus according to the embodiment of the present disclosure.

The virtual frame generator 1210 of the video encoding apparatus generates, using an interpolation model, an inferred frame $X_{t,pred}$ that is very similar to an original frame $X_t$ from previously decoded adjacent reference frames $X_{t-1}$ and $X_{t+1}$. The inferred frame $X_{t,pred}$ is used as the virtual reference frame. When an interpolation model adaptively trained to generate the frame $X_{t,pred}$ very similar to the original frame is used, the video encoding apparatus may generate a virtual reference frame with a high degree of similarity. This makes it possible for the video encoding apparatus to use the variable coefficient interpolation model that has been trained adaptively on an input frame to be encoded. In this case, the video encoding apparatus transmits the variable coefficient values of the trained interpolation model to the video decoding apparatus.

As the number of variable coefficients included in the interpolation model increases, the variable coefficient interpolation model can be trained so that it is easier to overfit an input frame to a target frame. However, when the number of variable coefficients increases in order to generate a frame more similar to the original frame using the interpolation model, this may cause an increase in the number of bits to be transmitted and reduce coding efficiency. Therefore, as the variable coefficient interpolation model, a model having good coding efficiency while using the smallest number of variable coefficients should be considered.

Meanwhile, the virtual frame generator 1310 of the video decoding apparatus sets variable coefficients of the interpolation model using the variable coefficient values transmitted from the video encoding apparatus, as described above. The interpolation model infers the frame $X_{t,pred}$ that is very similar to the original frame $X_t$ from the previously decoded adjacent reference frames $X_{t-1}$ and $X_{t+1}$. The inferred frame $X_{t,pred}$ is used as the virtual reference frame.

Hereinafter, training of the interpolation model performed by the video encoding apparatus is described. As described above, training of the interpolation model corresponds to the first step of video prediction based on the variable coefficient deep learning.

In order to train the interpolation model to generate the virtual reference frame, the video encoding apparatus may additionally include a training unit (not illustrated) or may be implemented in a form linked to an external training unit.

An operation of the interpolation model "f" that generates the inferred frame $X_{t,pred}$ from the previously decoded adjacent reference frames $X_{t-1}$ and $X_{t+1}$ as described above can be expressed as shown in Equation 4.

$$X_{t,pred} = f(X_{t-1}, X_{t+1}, \theta_t) \qquad \text{[Equation 4]}$$

Here, a parameter $\theta_t$ denotes variable coefficients.

The training unit may update the parameter $\theta_t$ to overfit on a t-th frame to be encoded. In this case, a loss function for training the interpolation model is defined as shown in Equation 5.

$$L = \frac{1}{H \times W} \sum_{i}^{H \times W} |X_{t,i} - X_{t,i,pred}|^2 \quad \text{[Equation 5]}$$

Here, H and W represent the number of vertical and horizontal pixels of the frame, respectively. $X_{t,i,pred}$ represents a value of i-th pixel of the inferred frame $X_{t,pred}$. $X_{t,i}$ represents a value of i-th pixel of the original frame. As described above, the video encoding apparatus transmits values of the respective variable coefficients $\theta_t$ trained for each frame to the video decoding apparatus. The video decoding apparatus may set the variable coefficients $\theta_t$ of the interpolation model that is the same as that included in the video encoding apparatus using the received values of the variable coefficients $\theta_t$, and then generate the virtual reference frame using the same method as shown in Equation 4.

Figure 15:
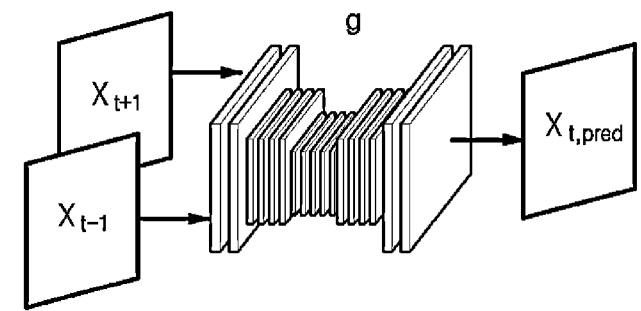
FIG. 15 illustrates examples of a variable coefficient interpolation model according to an embodiment of the present disclosure.
Figure 15:
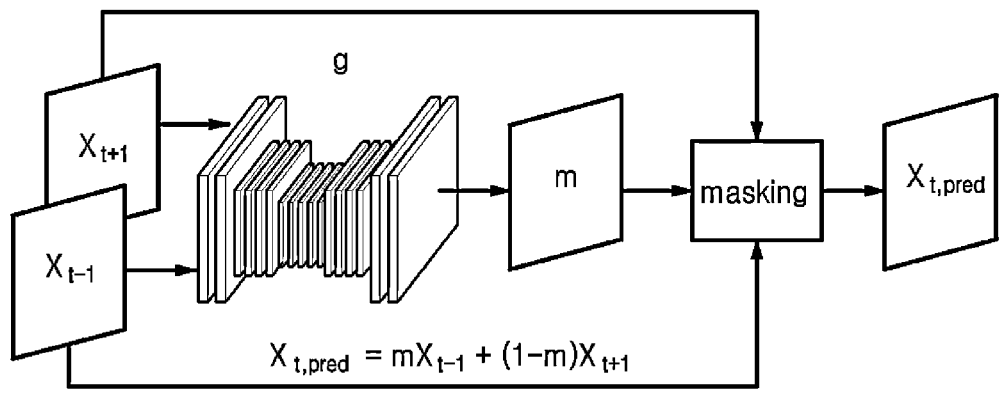
Figure 15:
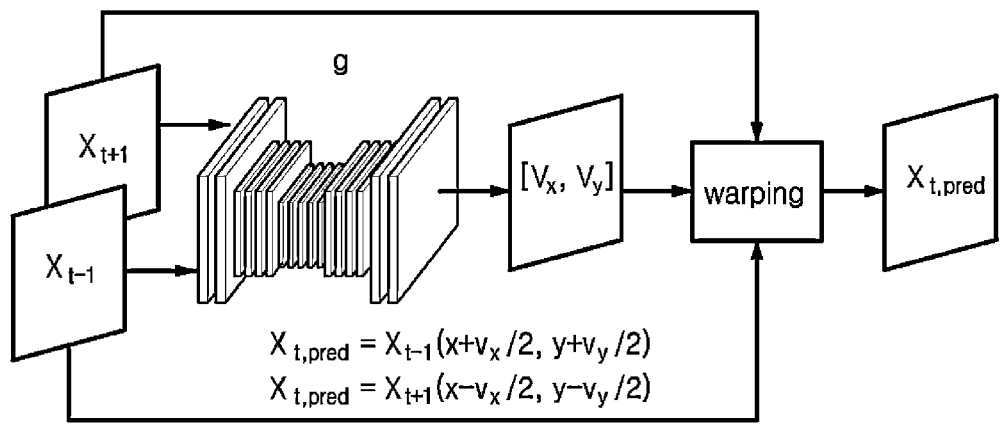

FIG. 15 illustrate examples of a variable coefficient interpolation model according to an embodiment of the present disclosure.

The interpolation model illustrated in FIG. 15 may be a convolutional neural network (CNN)-based deep learning model suitable for video processing.

The interpolation model according to the present disclosure may be a deep learning model that directly generates an inferred frame from adjacent reference frames, as illustrated in (a) of FIG. 15.

In another embodiment according to the present disclosure, the interpolation model may be a deep learning model using a mask (see Non-Patent Document 1), as illustrated in (b) of FIG. 15. In this case, the interpolation model may generate the mask from the reference frames and then perform weighted sum on the previously decoded adjacent reference frames $X_{t-1}$ and $X_{t+1}$ using the mask to generate the inferred frame $X_{t,pred}$.

In another embodiment according to the present disclosure, the interpolation model may be a deep learning model using an optical flow, as shown in (c) of FIG. 15. As described with respect to the BDOF, a deep learning model using the OF may generate the inferred frame $X_{t,pred}$ based on assuming temporal normalization. The interpolation model may generate the OF from the reference frames and then warps the reference frames on the basis of the OF to generate the inferred frame $X_{t,pred}$.

Meanwhile, the variable coefficients may be updated on the basis of the loss function shown in Equation 5 in any interpolation model illustrated in FIG. 15.

Any deep learning model illustrated in FIG. 15 may be used as the variable coefficient interpolation model. However, since the variable coefficient values should be transmitted, it is possible to improve coding efficiency only by using a simplest model. On the other hand, there is a problem that overfitting becomes difficult when a smaller number of variable coefficients is used.

As described above, in the interpolation model, a portion including variable coefficients is expressed as a variable coefficient network.

Figure 16:
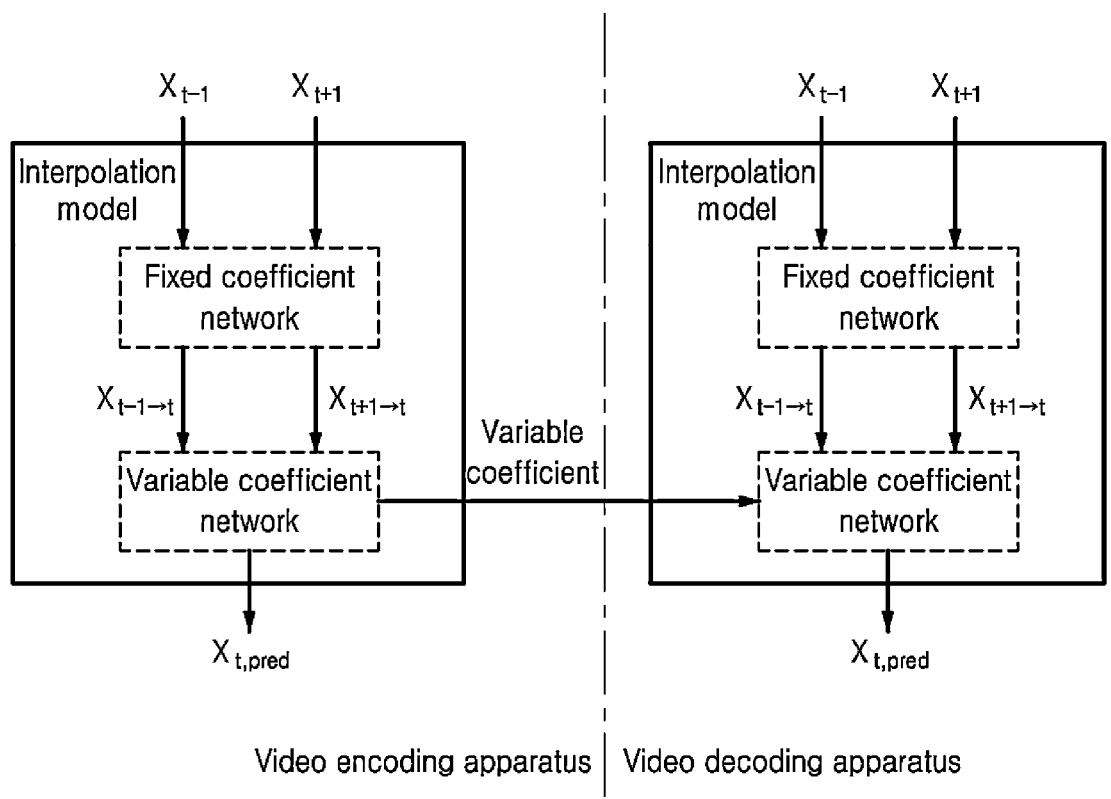
FIG. 16 is an illustrative diagram illustrating an interpolation model further including a fixed coefficient network according to an embodiment of the present disclosure.

FIG. 16 is an illustrative diagram illustrating an interpolation model further including the fixed coefficient network according to an embodiment of the present disclosure.

Therefore, as in the example of FIG. 16, the interpolation model further including the fixed coefficient network generates $X_{t-1 \to t}$ and $X_{t+1 \to t}$, which are frames similar to a frame to be encoded, as intermediate outputs, from input frames. In this case, the fixed coefficient network may be trained in advance in the video encoding apparatus on the basis of the entire data. Further, the video encoding apparatus and the video decoding apparatus may set the fixed coefficient network according to a predefined agreement in a state in which the same fixed-coefficient values are stored in the video encoding apparatus and the video decoding apparatus.

By using the intermediate outputs $X_{t-1 \to t}$ and $X_{t+1 \to t}$, the interpolation model can provide good performance using a smaller number of variable coefficients. Further, the video encoding apparatus transmits the variable coefficient values applied to the variable coefficient network to the video decoding apparatus.

As in the example of FIG. 16, it is possible to overfit on a frame to be encoded by combining the variable coefficient network to the back end of the fixed coefficient network, but in another embodiment, only the variable coefficient network may be used without the fixed coefficient network. In this case, the interpolation model including only the variable coefficient network may be implemented in a reduced form of an interpolation model including an existing fixed coefficient network by using a training method based on a student-teacher network.

Hereinafter, a scheme for reducing an amount of data of variable coefficients is described using the example of FIG. 17.

Figure 17:
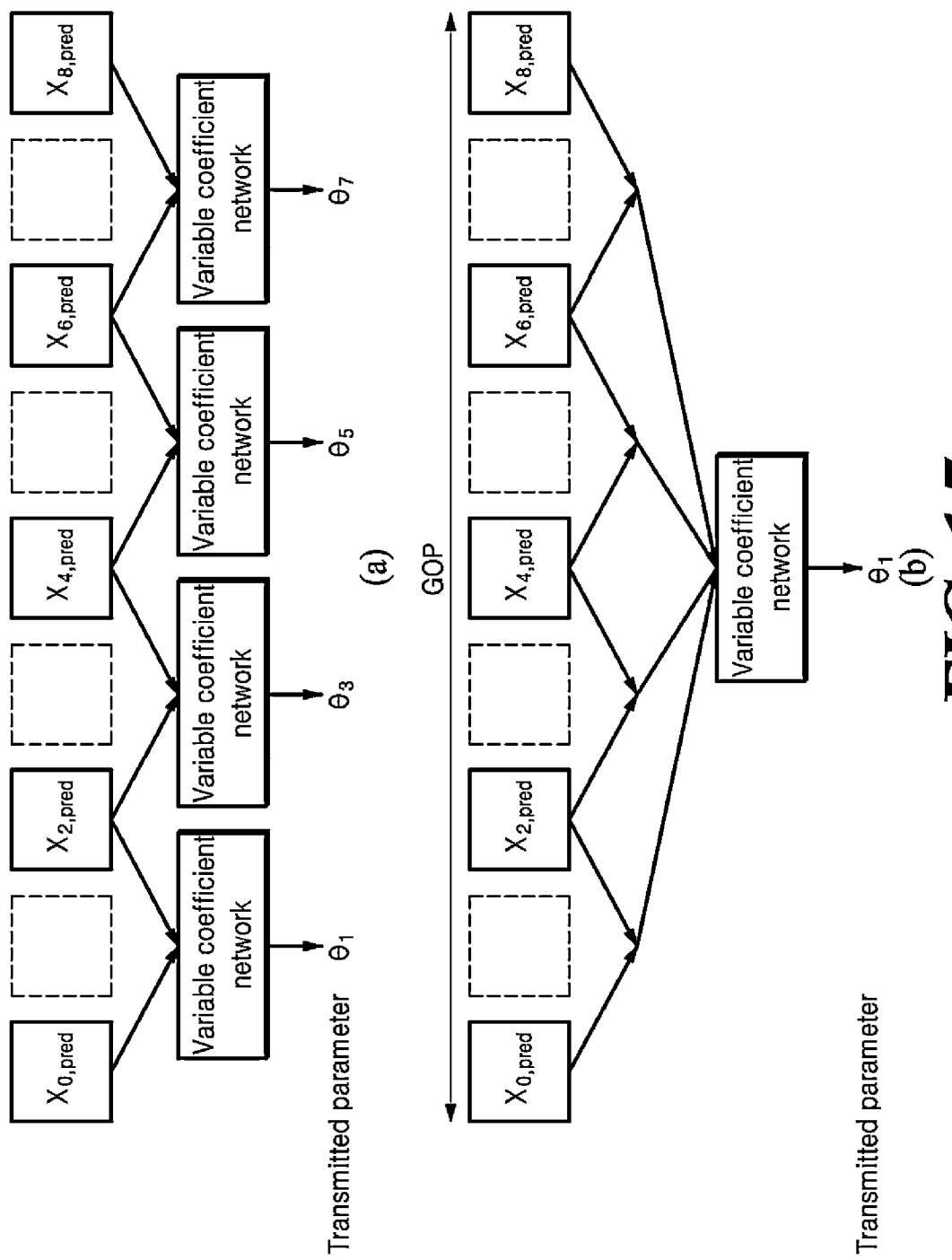
FIG. 17 is an illustrative diagram illustrating a method of transmitting a variable coefficient according to an embodiment of the present disclosure.

FIG. 17 is an illustrative diagram illustrating a method of transmitting the variable coefficients according to an embodiment of the present disclosure.

The video encoding apparatus may transmit the variable coefficients on a per-frame or per-GOP basis. As illustrated in (a) of FIG. 17, it is possible to transmit the variable coefficient $\theta_t$ every t unit, that is, every frame. However, the video encoding apparatus may reduce the data amount of the variable coefficients by transmitting the variable coefficients on a per-GOP basis or in units of a plurality of GOPs.

For example, when a size of the GOP is 9 as illustrated in (b) of FIG. 17, the video encoding apparatus may transmit variable coefficients on a per-GOP basis to transmit variable coefficients for each of four frames. Further, the video encoding apparatus may extend a transmission period in units of 2 GOPs or 3 GOPs. In this case, the interpolation model can be trained at a time in a state in which the input frames are accumulated in a batch, and the training unit can use a loss function in which time "t" is considered as in Equation 6.

$$L = \frac{1}{H \times W \times T} \sum_{t}^{T} \sum_{i}^{H \times W} |X_{t,i} - X_{t,i,pred}|^2 \quad \text{[Equation 6]}$$

Here, T represents the number of frames included in a training batch.

On the other hand, the variable coefficients $\theta_t$ in a floating point 32-bit format are basically used in the training process, but the video encoding apparatus may change the variable coefficient values in a decimal point format of 16 bits, 8 bits, or less and then transmit the variable coefficient values to the video decoding apparatus.

In another embodiment according to the present disclosure, the video encoding apparatus may quantize the variable coefficients $\theta_t$ and then transmit the quantized variable coefficients $\theta_t$ to the video decoding apparatus. For example, the video encoding apparatus may divide a range of the variable coefficients $\theta_t$ into uniform sections to quantize the variable coefficients.

In another embodiment according to the present disclosure, the video encoding apparatus may transmit a preset number of sets of variable coefficients instead of directly transmitting the variable coefficient values for each frame or GOP. Alternatively, in a state in which sets of variable coefficients are commonly stored in the video encoding apparatus and the video decoding apparatus, the video encoding apparatus may transmit only a predefined index to indicate one set of variable coefficients. Here, the sets of variable coefficients may be determined in advance in a process of training the interpolation model according to signal characteristics of a video sequence, a type of video content, a quantization parameter, and the like.

Hereinafter, a process of using the virtual reference frame generated by the interpolation model for inter prediction is described using the flowcharts of FIGS. 18 and 19.

Figure 18:
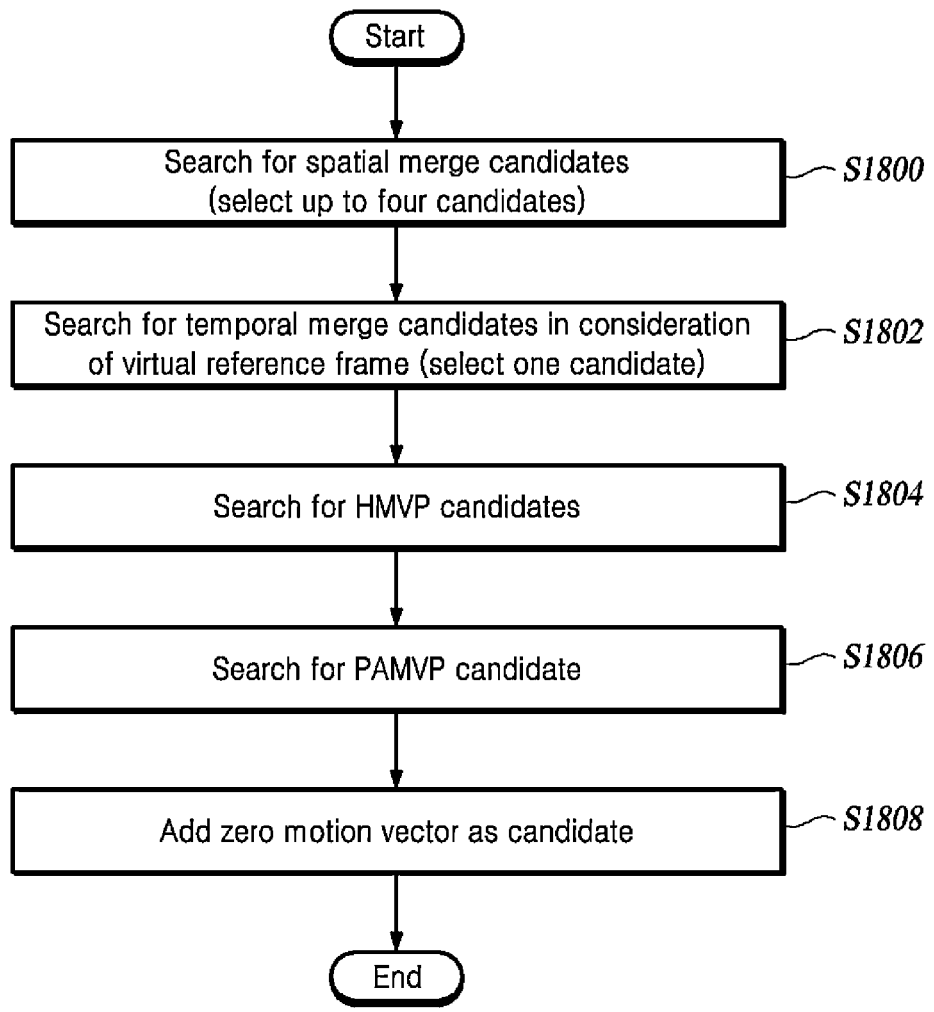
FIG. 18 is a flowchart illustrating a process of using a virtual reference frame in a merge or skip mode of inter prediction according to an embodiment of the present disclosure.

FIG. 18 is a flowchart illustrating a process of using the virtual reference frame in the merge or skip mode of the inter prediction according to an embodiment of the present disclosure.

The inter predictor 124 searches for spatial merge candidates (S1800). The inter predictor 124 searches for the spatial merge candidates from the neighboring blocks as illustrated in FIG. 4. In this case, a reference picture of the neighboring block may be the virtual reference frame or an existing reference frame.

The inter predictor 124 searches for temporal merge candidates in consideration of the virtual reference frame (S1802).

The inter predictor 124 checks whether a picture in which there is the block at the same position as the current block and a reference frame of the temporal merge candidate are the virtual reference frame or the existing reference frame.

When both the picture in which there is the block at the same position as the current block and the reference frame of the temporal merge candidate are the virtual reference frames, the inter predictor 124 sets the zero motion vector as a candidate and uses the virtual reference frame of the current picture in the skip or merge mode.

When the picture in which there is the block at the same position as the current block is the virtual reference frame and the reference frame of the temporal merge candidate is the existing reference frame, the inter predictor 124 sets the zero motion vector as a candidate, and uses the virtual reference frame of the current picture in the skip or merge mode. Alternatively, the inter predictor 124 may not set the candidate as the temporal merge candidate.

On the other hand, when the picture in which there is the block at the same position as the current block is the existing reference frame and the reference frame of the temporal merge candidate is the virtual reference frame, the inter predictor 124 sets the zero motion vector as a candidate and uses the virtual reference frame of the current picture in the skip or merge mode. Alternatively, the inter predictor 124 may not set the candidate as the temporal merge candidate.

The inter predictor 124 searches for the HMVP candidates (S1804). When the motion vectors of the previous n CUs are stored in the table, the inter predictor 124 may include encoded CUs with reference to the virtual reference frame. As described above, the inter predictor 124 may set recent motion vectors among the HMVP candidates stored in the table as merge candidates.

The inter predictor 124 searches for a PAMVP candidate (S1806).

First, the reference picture of the PAMVP is set like a reference picture of a first merge candidate. When the first merge candidate uses the virtual reference frame, the inter predictor 124 may set, as the merge candidate, a motion vector corresponding to an average between the zero motion vector and the motion vector of the second candidate.

In a case in which the merge candidate list cannot be filled even when all of the above processes (S1800 to S1806) are performed (i.e., in a case in which the preset number cannot be filled), the inter predictor 124 adds the zero motion vector as the merge candidate (S1808).

Figure 19:
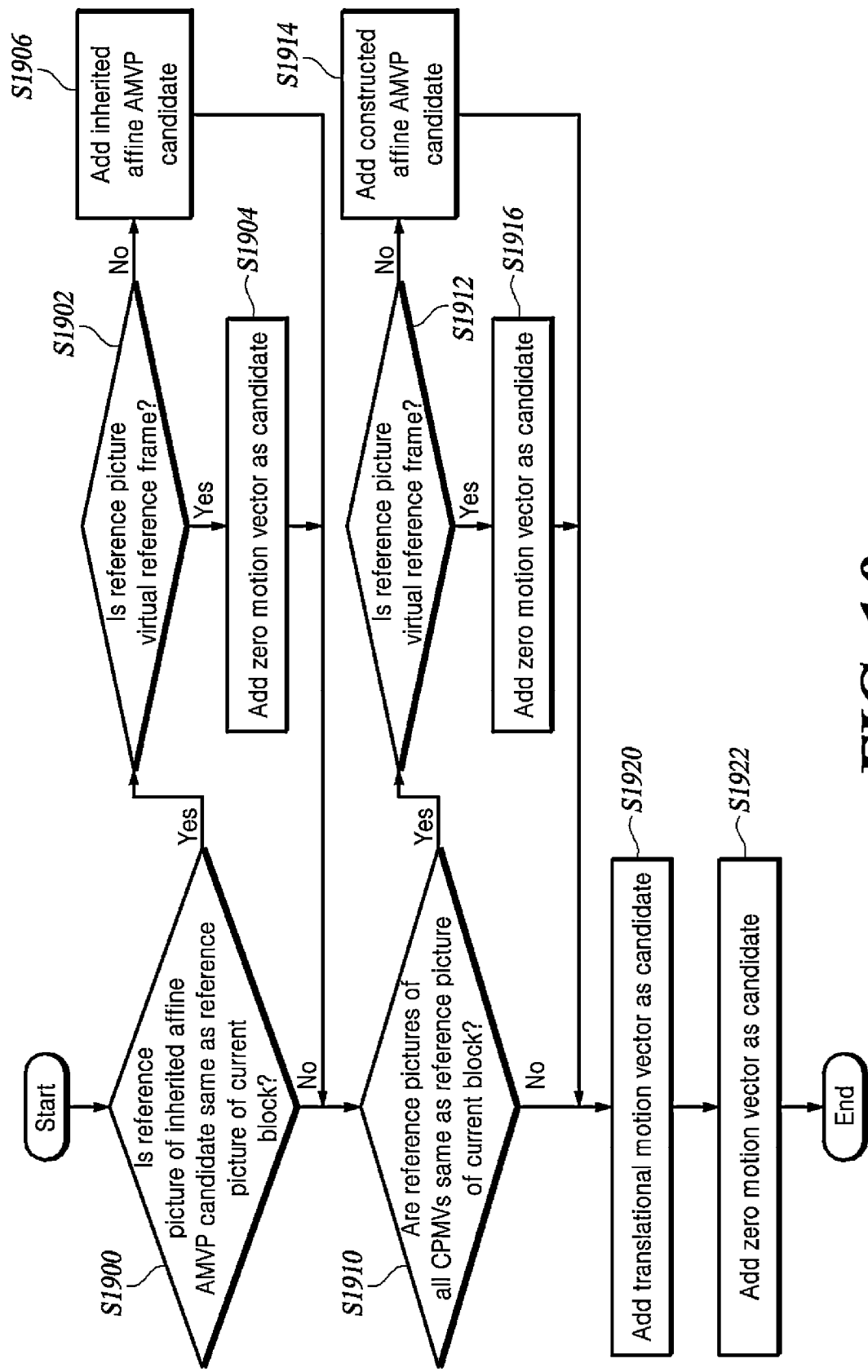
FIG. 19 is a flowchart illustrating a process of using a virtual reference frame in an affine AMVP mode of inter prediction according to an embodiment of the present disclosure.

FIG. 19 is a flowchart illustrating a process of using the virtual reference frame in the affine AMVP mode of inter prediction according to an embodiment of the present disclosure.

The inter predictor 124 checks whether the reference picture of the inherited affine AMVP candidate is the same as the reference picture of the current block (S1900).

When the reference picture of the inherited affine AMVP candidate is the same as the reference picture of the current block (Yes in S1900), the inter predictor 124 checks whether the same reference picture is the virtual reference frame or the existing reference frame (S1902).

When the same reference picture is the virtual reference frame (Yes in S1902), the inter predictor 124 adds the zero motion vector as the affine AMVP candidate (S1904).

When the same reference picture is the existing reference frame (No in S1902), the inter predictor 124 adds the inherited affine AMVP candidate (S1906). Alternatively, the inter predictor 124 may not add the candidate as the inherited affine AMVP candidate.

When the reference picture of the inherited affine AMVP candidate is not the same as the reference picture of the current block (No in S1900), the inter predictor 124 checks whether the reference pictures of all the CPMVs of the constructed affine AMVP candidate are the same as the reference picture of the current block (S1910).

When the reference pictures of all the CPMVs of the constructed affine AMVP candidates are the same as the reference picture of the current block (Yes in S1910), the inter predictor 124 checks whether the same reference picture is the virtual reference frame or the existing reference frame (S1912).

When the same reference picture is the virtual reference frame (Yes in S1912), the inter predictor 124 adds the zero motion vector as the affine AMVP candidate (S1916).

When the same reference picture is the existing reference frame (No in S1912), the inter predictor 124 adds the constructed affine AMVP candidate (S1914). Alternatively, the inter predictor 124 may not add the candidate as the constructed affine AMVP candidate.

When the reference pictures of all the CPMVs of the constructed affine AMVP candidate is not the same as the reference picture of the current block (No in S1910), the inter predictor 124 adds the translational motion vector as the affine AMVP candidate (S1920).

In a case in which the candidate list cannot be filled even when all of the above processes (S1900 to S1920) are performed (i.e., in a case in which the preset number cannot be filled), the inter predictor 124 adds the zero motion vector as the affine AMVP candidate (S1922).

Meanwhile, in the above description, the steps (S1900 to S1916, and S1922) other than the step of adding the translational motion vector as a candidate may be similarly applied to a process of searching for the affine merge candidate by the inter predictor 124.

As described above, according to the present embodiment, an inter prediction method, which includes referring to a virtual reference frame generated by a variable coefficient deep learning-based interpolation model, is provided, and the method increases the accuracy of inter prediction and improve coding efficiency.

Each of the flowcharts according to the present embodiment describes that respective processes are sequentially executed, but the present disclosure is not necessarily limited thereto. In other words, since changing and executing the processes described in the flowchart or executing one or more processes in parallel is applicable, the flowchart is not limited to a time-series order.

In the above description, it should be understood that the embodiments may be implemented in many different ways. Functions or methods described in one or more examples may be implemented in hardware, software, firmware, or any combination thereof. It should be understood that functional components described in the present specification have been labeled " . . . unit" to particularly further emphasize implementation independence thereof. When a unit, component, device, element, or the like of the present disclosure is described as having a purpose or performing an operation, function, or the like, the unit, component, device, or element should be considered herein as being "configured to" meet that purpose or to perform that operation or function.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill should understand the scope of the claims is not to be limited by the above explicitly described embodiments but by the claims and equivalents thereof.

REFERENCE NUMERALS 190, 570: Memory
510: Entropy decoder
124, 544: Inter-predictor
1210, 1310: Virtual frame generator

What is claimed is:

1. A video decoding method performed by a video decoding apparatus, the video decoding method comprising:
decoding variable coefficient values, an affine prediction flag, and an encoding mode from a bitstream, the affine prediction flag indicating whether affine motion prediction is applied to a current block, and the encoding mode being an encoding mode for motion information of the current block and indicating a merge mode or an advanced motion vector prediction (AMVP) mode;
generating a virtual reference frame based on reference frames by using an interpolation model, wherein a variable coefficient network included in the interpolation model is set with the variable coefficient values; and
generating a merge candidate of the current block based on the virtual reference frame and the reference frames when the encoding mode is the merge mode.

2. The video decoding method of claim 1, wherein the interpolation model is one of:
a deep learning model configured to directly generate the virtual reference frame from the reference frames;
a deep learning model configured to generate a mask from the reference frames and then perform weighed sum on the reference frames based on the mask to generate the virtual reference frame; or
a deep learning model configured to generate an optical flow from the reference frames and then warp the reference frames based on the optical flow to generate the virtual reference frame.

3. The video decoding method of claim 1, wherein the variable coefficients values are transmitted from a video encoding apparatus and decoded by the video decoding apparatus, wherein the variable coefficients values are generated in advance by the video encoding apparatus updating the variable coefficient network of the interpolation model using a loss function based on a difference between an inferred frame generated by the interpolation model and an original frame.

4. The video decoding method of claim 1, wherein the interpolation model further includes a fixed coefficient network, and
wherein fixed coefficient values of the fixed coefficient network are generated under pre-training based on an entire original reference frame and are set according to a predefined agreement.

5. The video decoding method of claim 4, wherein the variable coefficient network of the interpolation model is connected to a back end of the fixed coefficient network.

6. The video decoding method of claim 1, wherein the variable coefficient values are decoded per frame or at least one group of picture (GOP).

7. The video decoding method of claim 1, wherein the generating of the merge candidates includes:
searching for spatial merge candidates; and
searching for a temporal merge candidate in consideration of the virtual reference frame.

8. The video decoding method of claim 7, wherein the searching for the temporal merge candidate includes setting a zero motion vector as the merge candidate when both 1) a reference frame of the temporal merge candidate and 2) a picture in which there is a co-located block of the current block are the virtual reference frames.

9. The video decoding method of claim 1, further comprising:
generating an affine AMVP candidate when the affine prediction flag is true and the encoding mode is the AMVP mode,
wherein the generating of the affine AMVP candidate includes:
adding an inherited affine AMVP candidate in consideration of the virtual reference frame; and
adding a constructed affine AMVP candidate in consideration of the virtual reference frame.

10. The video decoding method of claim 9, wherein the adding of the inherited affine AMVP candidate includes adding a zero motion vector as the affine AMVP candidate when a reference picture of the inherited affine AMVP candidate and the reference picture of the current block are the same reference picture, and when the same reference picture is the virtual reference frame.

11. The video decoding method of claim 9, wherein the adding of the constructed affine AMVP candidate includes adding a zero motion vector as a reference picture when a reference picture of all control point motion vectors of the constructed affine AMVP candidate and the reference picture of the current block are the same reference picture, and when the same reference picture is the virtual reference frame.

12. A video encoding method performed by a video encoding apparatus, the video encoding method comprising:
acquiring previously generated variable coefficient values and a preset encoding mode, the encoding mode being an encoding mode for motion information of a current block and indicating a merge mode or an advanced motion vector prediction (AMVP) mode;
generating a virtual reference frame from reference frames by using an interpolation model, wherein a variable coefficient network included in the interpolation model is set with the variable coefficient values; and
generating a merge candidate of the current block based on the virtual reference frame and the reference frames when the encoding mode is the merge mode.

13. The video encoding method of claim 12, wherein the variable coefficient values are generated by updating the variable coefficient network of the interpolation model, and wherein updating of the variable coefficient network uses a loss function based on a difference between an inferred frame generated by the interpolation model and an original frame.

14. The video encoding method of claim 12, wherein the interpolation model further includes a fixed coefficient network, and fixed coefficient values of the fixed coefficient network are generated under pre-training based on an entire original reference frame and are set according to a predefined agreement.

15. The video encoding method of claim 12, wherein the variable coefficient values are encoded per frame or at least one group of picture (GOP).

16. A method for providing video data to a video decoding device, the method comprising:
encoding the video data into a bitstream; and
transmitting the bitstream to the video decoding device,
wherein encoding the video data comprises:
acquiring previously generated variable coefficient values and a preset encoding mode from a bitstream, the encoding mode being an encoding mode for motion information of a current block and indicating a merge mode or an advanced motion vector prediction (AMVP) mode;
generating a virtual reference frame from reference frames using an interpolation model, wherein a variable coefficient network included in the interpolation model is set with the variable coefficient values; and
generating a merge candidate of the current block based on the virtual reference frame and the reference frames when the encoding mode is the merge mode.

* * * * *